US011670285B1

(12) United States Patent
Crews et al.

(10) Patent No.: US 11,670,285 B1
(45) Date of Patent: Jun. 6, 2023

(54) SPEECH PROCESSING TECHNIQUES

(71) Applicant: Amazon Technologies, Inc., Seattle, WA (US)

(72) Inventors: Kevin Crews, Seattle, WA (US); Prasanna H Sridhar, Sammamish, WA (US); Ariya Rastrow, Seattle, WA (US); Nicholas Matthew Jutila, Roslindale, MA (US); Andrew Oberlin, Lynnwood, WA (US); Samarth Batra, Seattle, WA (US); Paul Anthony Bernhardt, Seattle, WA (US); Veerdhawal Pande, Walpole, MA (US); Roland Maximilian Rolf Maas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 17/102,910

(22) Filed: Nov. 24, 2020

(51) Int. Cl.
*G06F 40/40* (2020.01)
*G10L 13/08* (2013.01)
*G10L 13/04* (2013.01)
*G10L 15/187* (2013.01)
*G10L 15/02* (2006.01)

(52) U.S. Cl.
CPC .............. *G10L 13/08* (2013.01); *G10L 13/04* (2013.01); *G10L 15/187* (2013.01); *G10L 2015/025* (2013.01)

(58) Field of Classification Search
None
See application file for complete search history.

(56) References Cited

U.S. PATENT DOCUMENTS

| 10,891,959 B1 * | 1/2021 | Moeller | ................. H04L 67/52 |
| 2011/0123967 A1 * | 5/2011 | Perronnin | ................. G09B 7/02 |
| | | | 434/362 |

* cited by examiner

*Primary Examiner* — Jakieda R Jackson
(74) *Attorney, Agent, or Firm* — Pierce Atwood LLP

(57) ABSTRACT

Techniques for an interactive turn-based reading experience are described. A system may take turns reading content, such as a book, with a user. The system may process audio data representing a user reading a portion of the content, determine reading evaluation data, and determine how to proceed for the next turn based on the reading evaluation data. For example, based on the reading evaluation data, the system may read a portion of the content by outputting synthesized speech representing the content, may ask the user re-read a portion of the content, or may ask the user to read a different, smaller portion of the content.

20 Claims, 15 Drawing Sheets

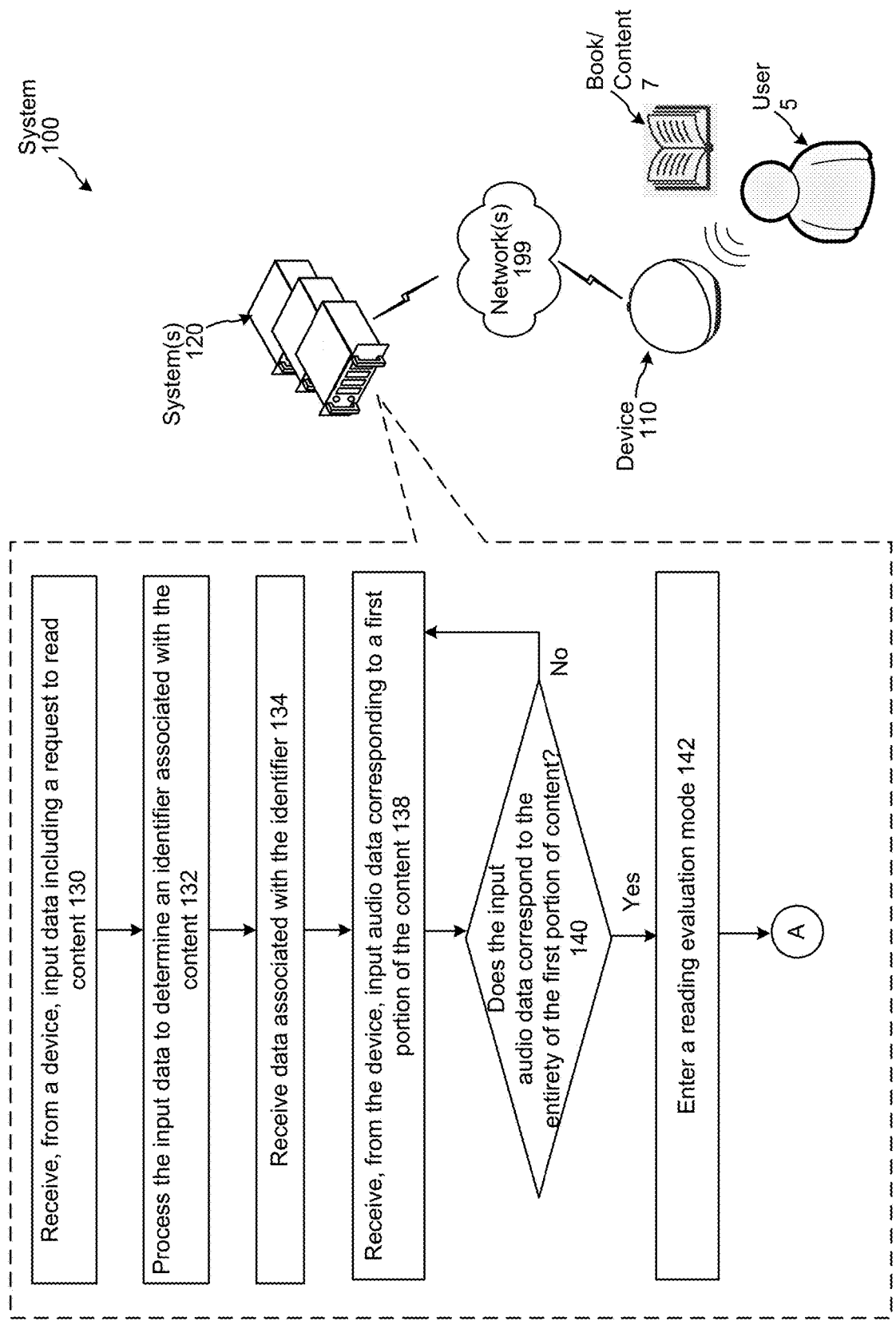

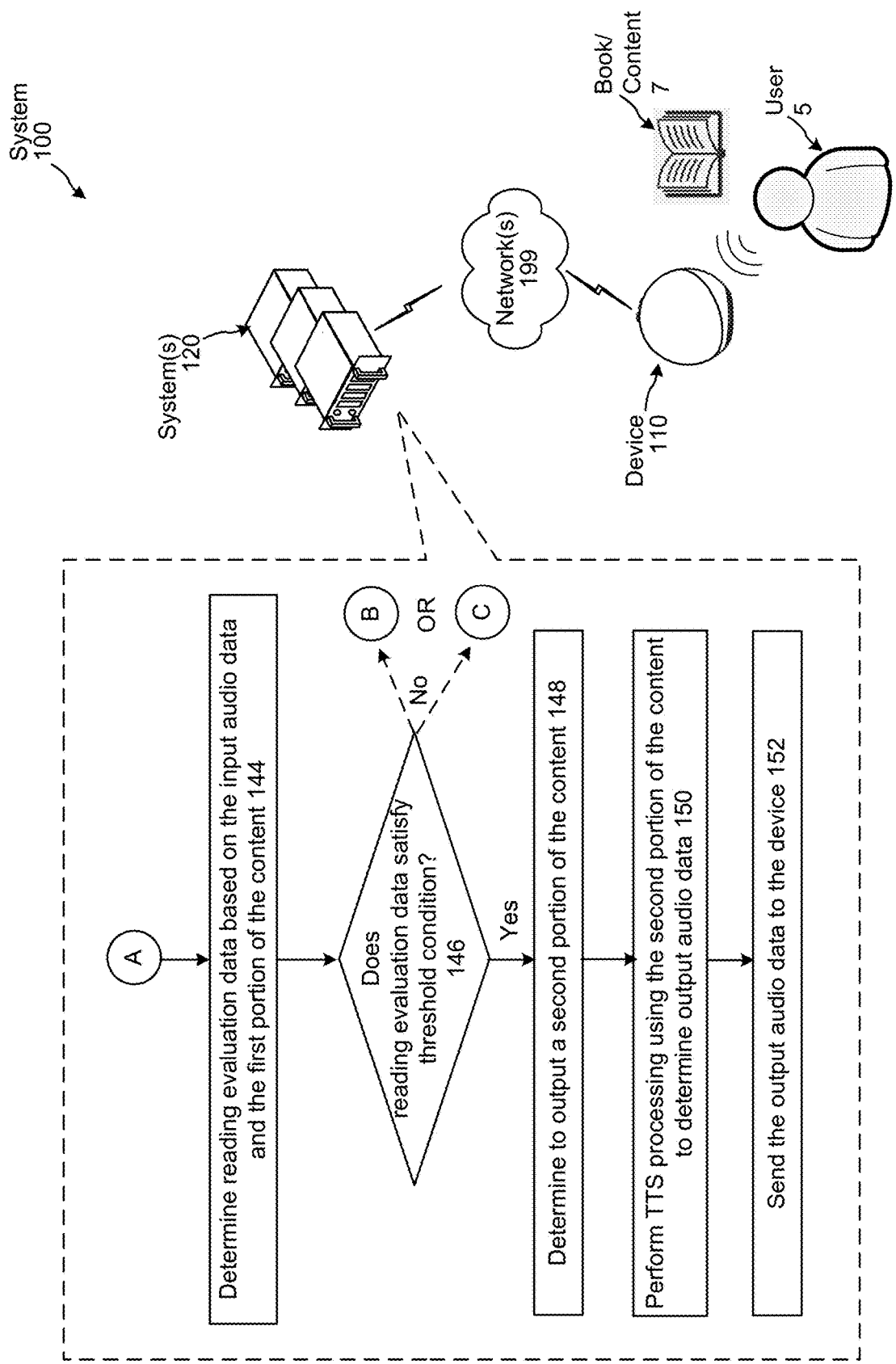

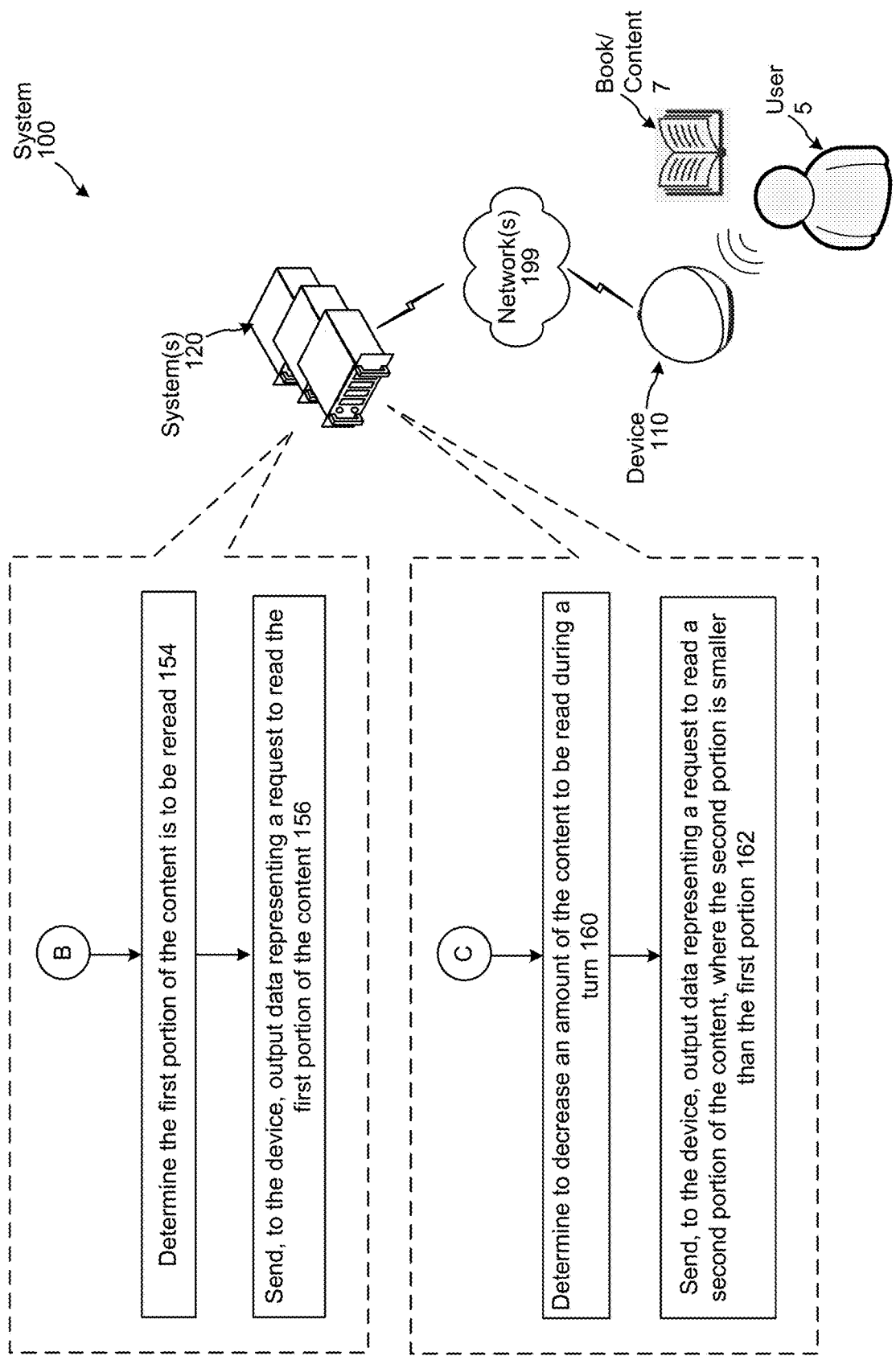

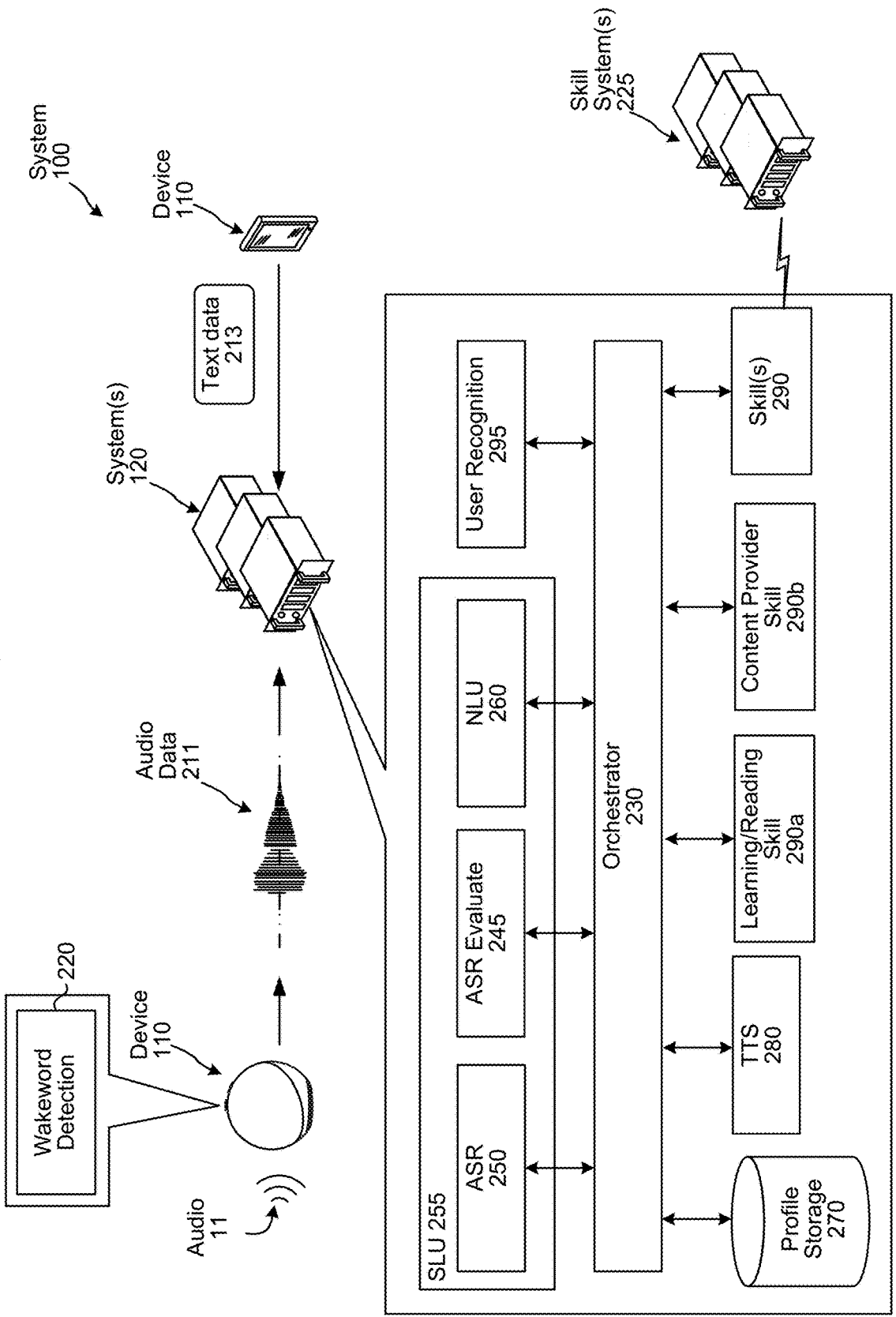

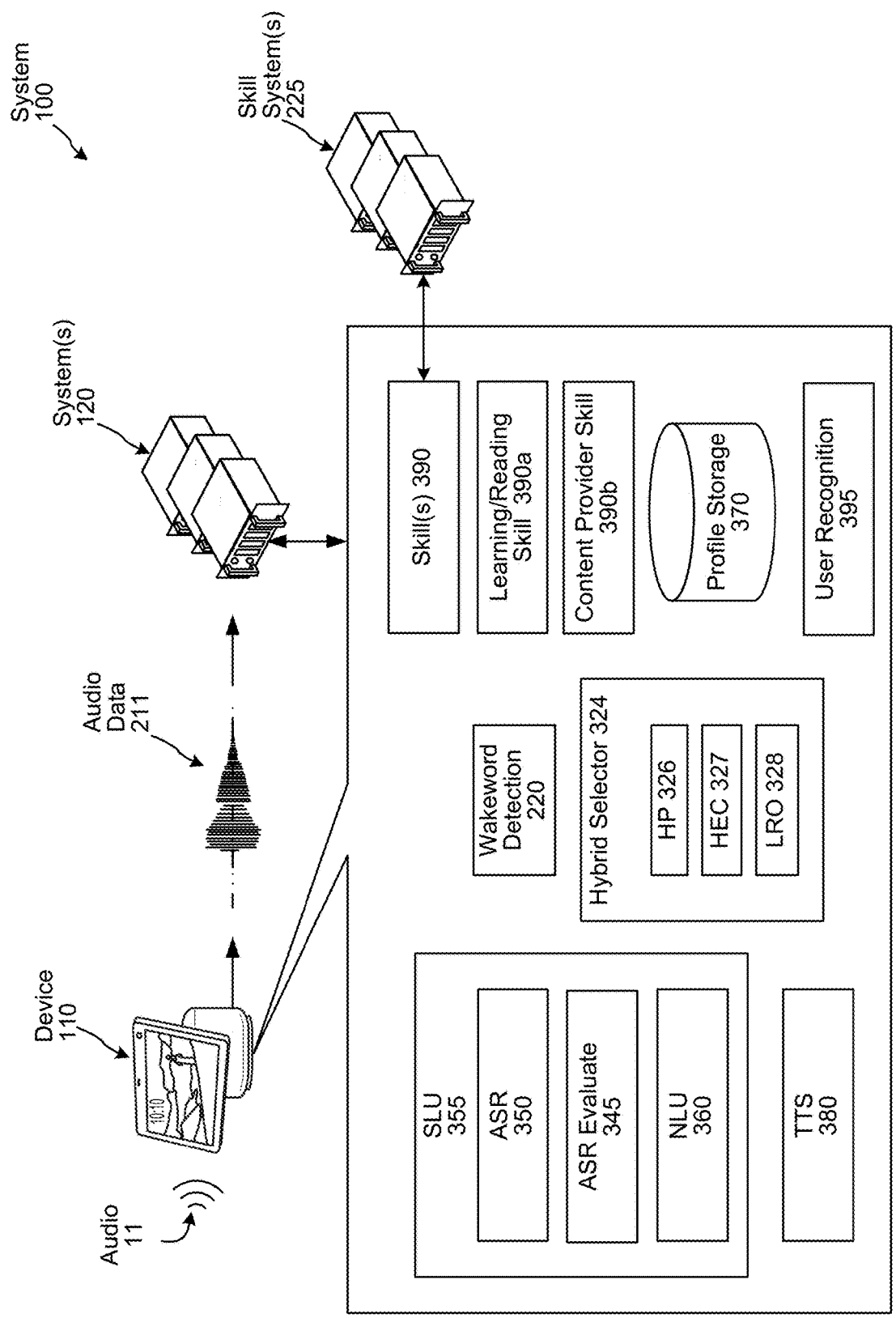

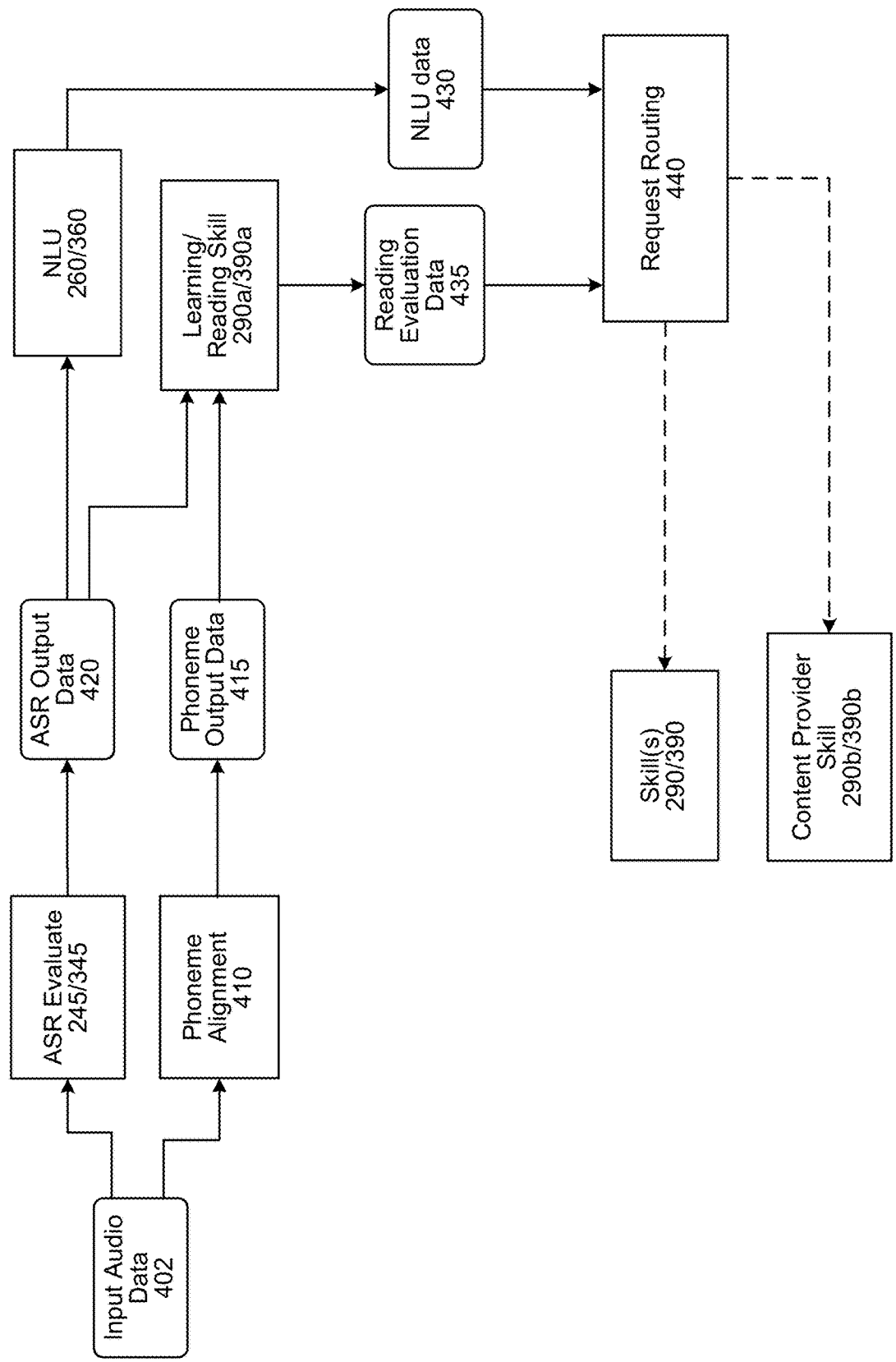

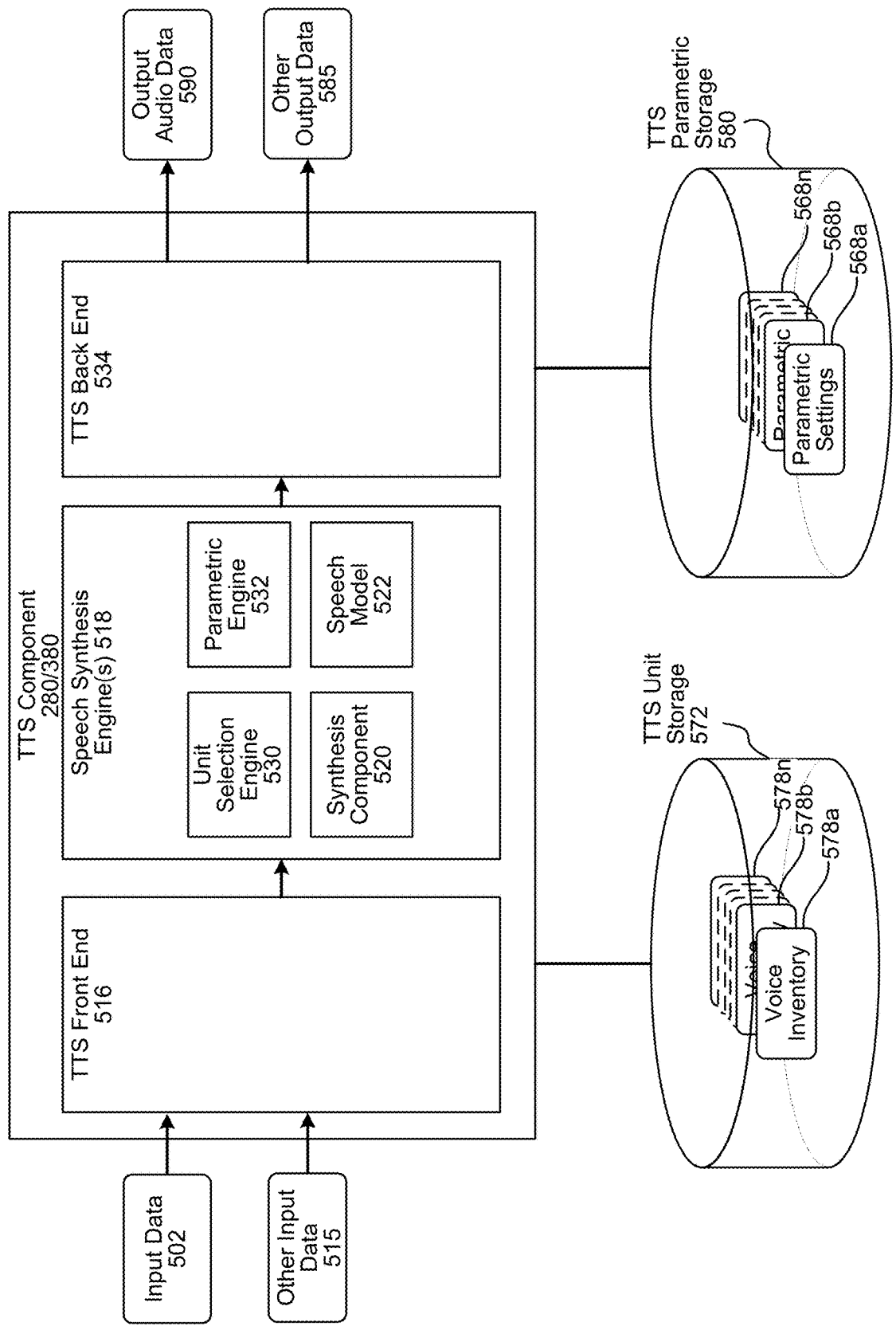

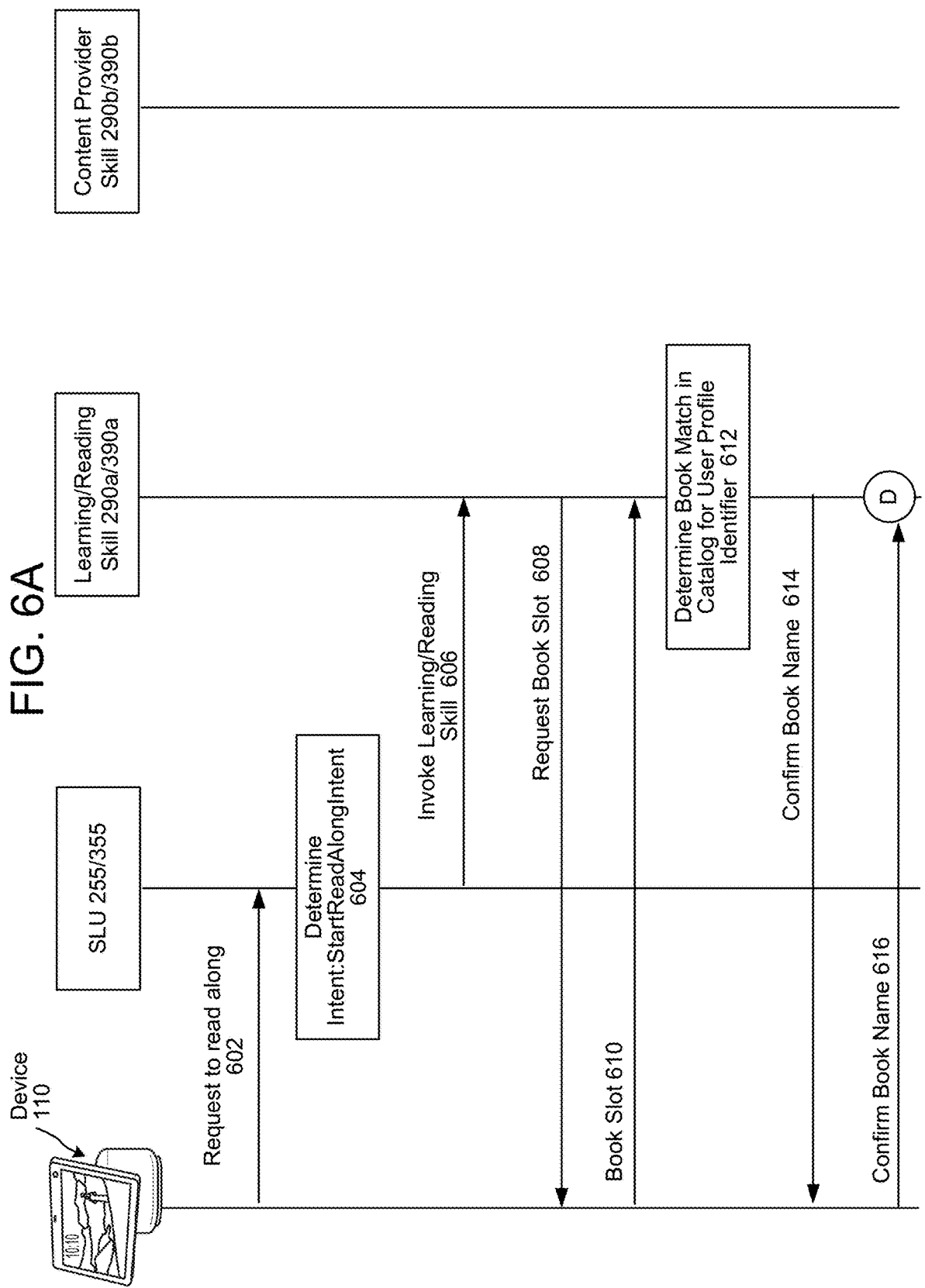

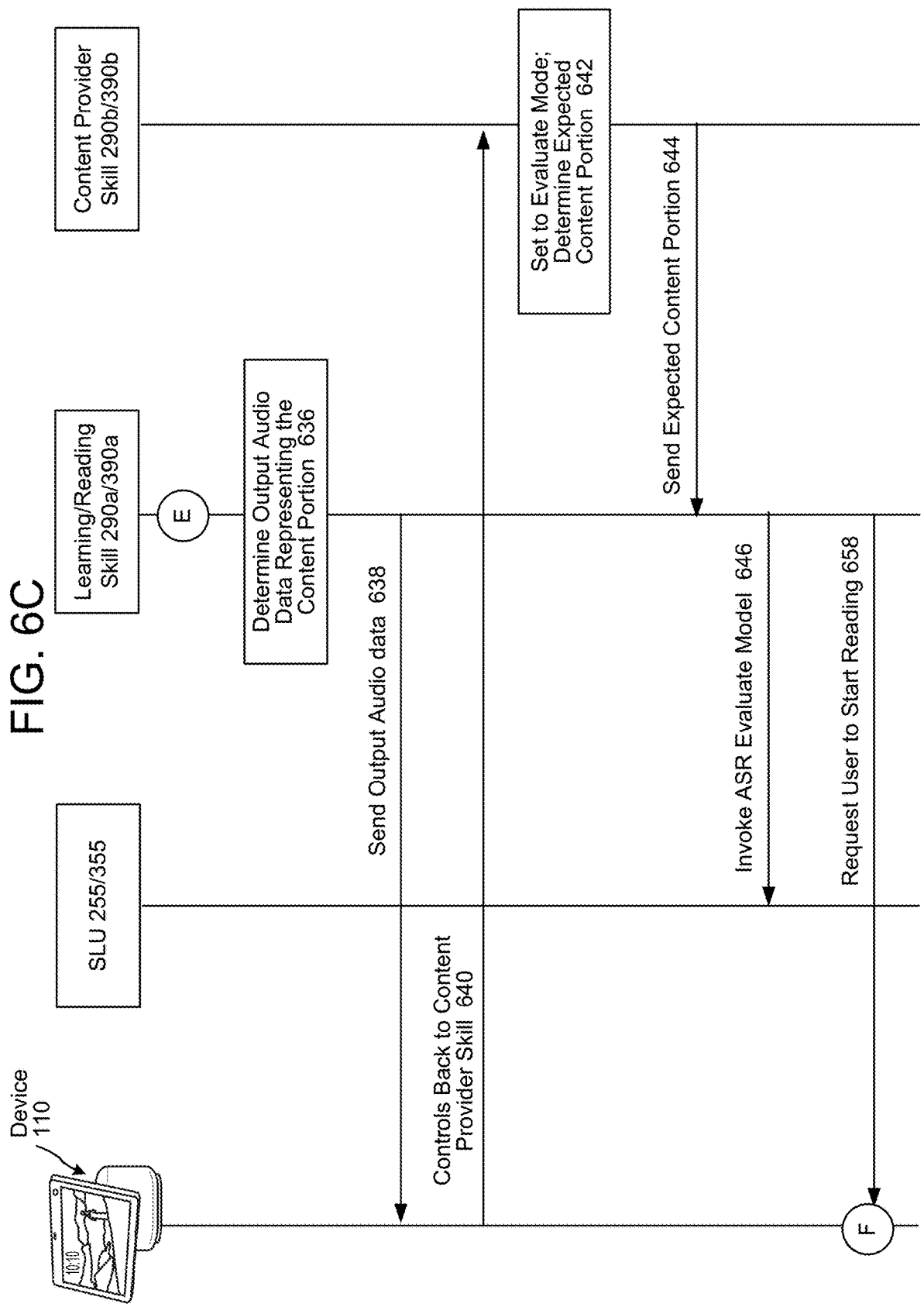

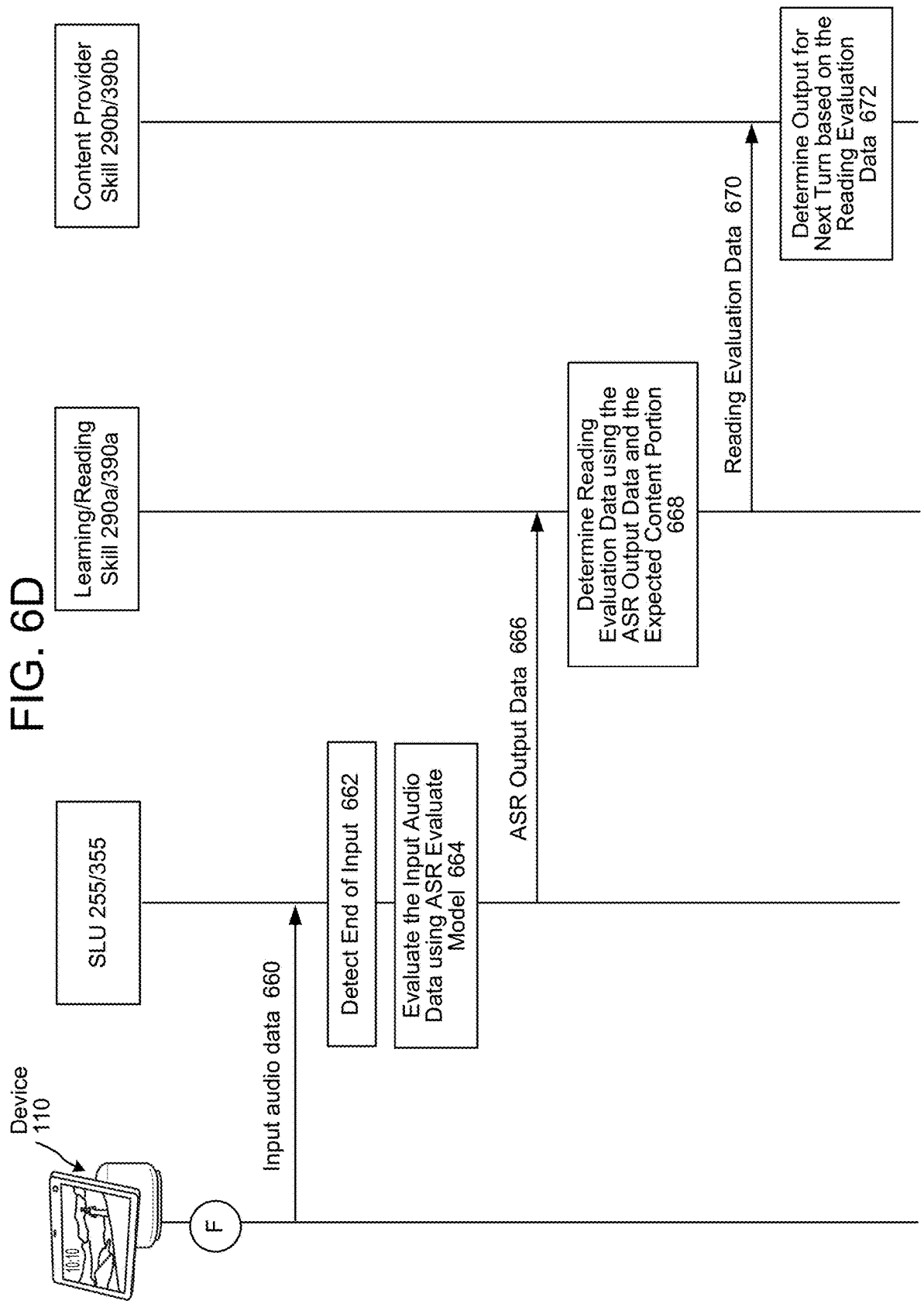

SPEECH PROCESSING TECHNIQUES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1C are conceptual diagrams illustrating a system configured to process speech inputs representing content read by a user, according to embodiments of the present disclosure.

FIG. 2 is a conceptual diagram of components of a system, according to embodiments of the present disclosure.

FIG. 3 is a conceptual diagram illustrating components that may be included in a device, according to embodiments of the present disclosure.

FIG. 4 is a conceptual diagram of components of a system to process inputs representing reading of content, according to embodiments of the present disclosure.

FIG. 5A is a conceptual diagram of text-to-speech components according to embodiments of the present disclosure.

FIGS. 6A-6D is a signal flow diagram illustrating how a request to read along may be processed, according to embodiments of the present disclosure.

DETAILED DESCRIPTION

Figure 5B:
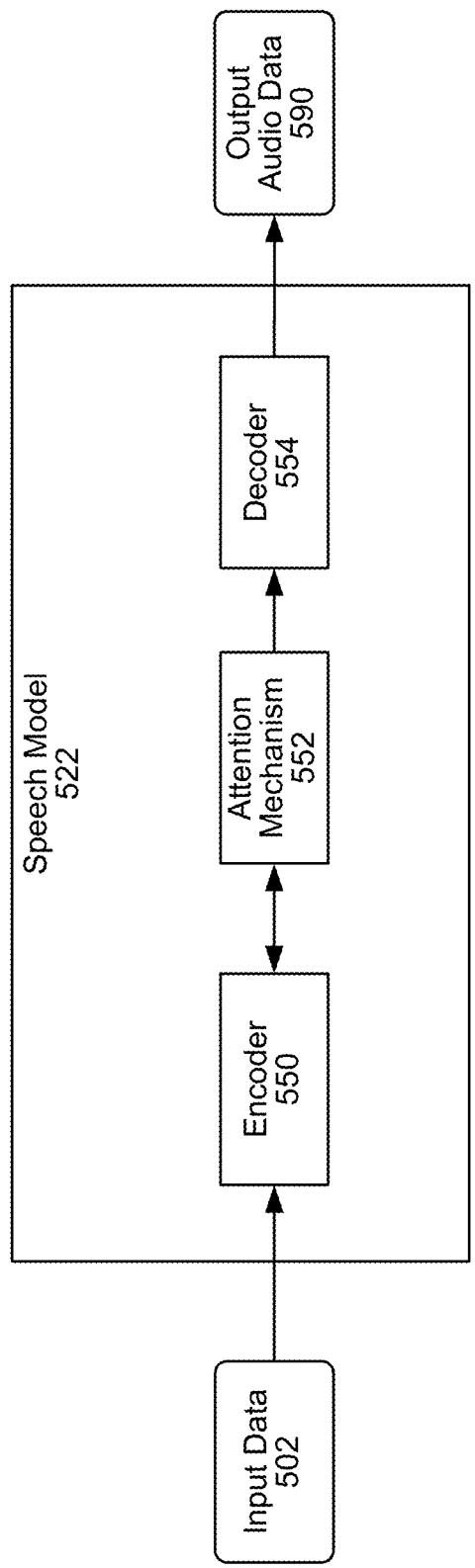
FIG. 5B is a conceptual diagram of a speech model according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to user inputs. For example, for the user input of "Alexa, play music by <Artist>," a system may output music sung by the indicated artist. For further example, for the user input of "Alexa, turn on the lights," a system may turn on lights based on where the user is located.

The system of the present disclosure may also use, among other things, ASR processing to evaluate a user's reading abilities, and engage the user in an interactive turn-based reading of content (e.g., physical books, digital books, magazines, articles, webpages, blogs, etc.). In the turn-based reading of content, the system and the user may take turns reading portions of the content, for example, the user may read a paragraph of a book and the system may "read" the next paragraph of the book. The system can provide feedback to the user based on the user's reading abilities. The system can also suggest the user re-read certain portions of the content, or the system may "read" the content itself (by outputting synthesized speech representing the content). In one example, the system of the present disclosure can be used to improve a child's reading capabilities and comprehension. When the system notices the child's reading could be improved, the system may take over reading the content, may take more frequent turns than the child to read the content, may read larger portions of the content than the child, and/or may ask the child to only read specific words or sentences. When the child is reading well, the system may ask the child to read larger sections of the content than the system.

The system can determine if the user is reading well or could be improved based on reading evaluation data that, in some embodiments, is based on the words that the user misreads and/or otherwise mispronounces. For example, the user may skip some words when reading, may substitute some words and/or may insert some words. The user may also mispronounce some words and/or take some time in saying some words. The system can process input audio data, representing the user reading some content, use ASR processing to determine which words the user spoke, compare the processed input audio data with the content the user was expected to read, and determine the reading evaluation data.

The system can employ techniques to determine when the user is finished reading the expected content. For example, the system may ask the user to read the first paragraph of a book. To capture the user's speech, the system may open one or more microphones at a user device, and may close the microphone(s) after the user finishes reading the first paragraph. The system can also provide feedback in response to the user's reading of the first paragraph, and can determine how to proceed for the next turn based on the user's reading of the first paragraph. In this manner, the system provides an interactive turn-based read along experience that is responsive to how well the user is reading. In some embodiments, the system also employs techniques to determine if a speech input from the user relates to reading content or to a spoken command.

In another example, the system of the present disclosure can be used to learn a new language. The system can process input audio data representing the user reading content (e.g., a word, sentence, paragraph, etc.) in a non-native language, and provide feedback to the user on pronunciations and reading accuracy. In yet another example, the system of the present disclosure can be used to provide speech therapy to a user.

The teachings of the present disclosure may provide an improved user experience with respect to an interactive reading experience. For example, the system can provide feedback after the user finishes reading a logical portion of the content (e.g., end of page), and/or in response to a user request for help (using voice, touching a word/button on screen, etc.). The system can also provide verbal feedback to the user and "read" along with the user, which can encourage young readers to improve their reading.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A-1C illustrate a system 100 configured to process speech inputs representing reading of content, in accordance with some embodiments. Although the figures and discussion of the present disclosure illustrate certain steps in a particular order, the steps described may be performed in a different order (as well as certain steps removed or added) without departing from the present disclosure. As shown in FIGS. 1A-1C, the system 100 may include the device 110 (local to a user 5) in communication with the system(s) 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

In some embodiments, the device 110 may be capable of receiving speech inputs. In some embodiments, the device 110 may also include a display (e.g., device 110b, device 110d, device 110f of FIG. 9). Referring to FIG. 1A, the system(s) 120 receives (130), from the device 110, input data including a request to read content. In some embodiments, the user 5 may request the device 110 to read content (e.g., a book) 7 along with the user 5. The book/content 7 may be a physical book, magazine, etc. that the user 5 possesses. In other embodiments, the book/content 7 may be a digital book, magazine, website, etc. that may be displayed using the display associated with the device 110. In other embodiments, the book/content 7 to be read may be sentences, paragraphs, or another collection of words displayed at the device 110. In providing the input, the user 5 may indicate that the user wants the user's reading of the book/content 7 to be evaluated for reading accuracy, pronunciation, and comprehension. The input may be a speech input provided by the user 5. In other embodiments, the input may be provided via a touch screen of the device 110 and may be a selection of an application icon that enables the device 110 to read along with the user 5.

In receiving the request to read book/content 7, the system(s) 120 may initiate a turn-based reading of the book/content 7, where the user 5 may read a portion of the book/content 7 and the device 110 may "read" the next portion of the book/content 7, the user 5 may read the next portion of the book/content 7, and so on. To track the reading turns, the system(s) 120 may associate a session identifier with the inputs provided by the user 5 and the outputs provided by the device 110.

The system(s) 120 processes (132) the input data to determine an identifier associated with the book/content 7. The input data (provided in step 130) may include a representation of the book/content 7 to be read. For example, in the case of a speech input, the input data may include speech corresponding to the title of a book, article, magazine, etc.; a page or paragraph number of a book, article, magazine, etc.; an author of a book, article, etc.; a series name associated with a book, magazine, etc.; etc. In another example, in the case of an input via a touchscreen, the input may include a selection of a book, article, magazine, etc. (or a page or paragraph of the book, article, magazine, etc.) to be read. The identifier determined by the system(s) 120 may include one or more of a book identifier (alphanumeric value, ISBN, etc.), a book title, a book author, a book series, a book volume number, a magazine title, a magazine volume number, a magazine issue number, an article author, an article name, a webpage author, a webpage name, a blog author, a blog name, a website URL where an article can be found, a website URL where a webpage can be accessed, etc. In some embodiments, the system(s) 120 may also determine a book/content version for the book/content 7, as different versions of a book/content 7 may differ in terms of paragraph breaks and page breaks.

In some embodiments, the system(s) 120 may determine a user profile identifier associated with the user 5. Based on the user profile identifier, the system(s) 120 may determine if the requested book/content 7 is available to the user 5 based on a subscription to a content provider, an application installed at the device 110, free content provided by a content source, etc.

In some embodiments, where the user 5 wants to read a physical book/content 7, the user 5 may hold up the book/content 7 to the device 110, and the device 110 may use a camera(s) to capture an image of the book/content 7 cover or the first page of the book/content 7 (that contains the ISBN, title, author, and other book/content 7 identifying information). The system(s) 120 may process image data representing the image to determine the identifier (in relation to step 132) associated with the book/content 7. The system(s) 120 may use one or more machine learning models implementing computer vision techniques, image processing techniques, text recognition techniques, and/or other techniques to determine the identifier from the image data. In some embodiments, the user 5 may scan a bar code on the book (or other content) using a camera(s) of the device 110 or a scanner of the device 110. In some embodiments, the user 5 may use another device (e.g., a tablet 110d, smart phone 110b, smart TV 110g, etc. shown in FIG. 9) to access the book/content 7 for reading, where the other device may be in communication with the system(s) 120 and/or the device 110 via the network(s) 199, and may be associated with the user profile identifier of the user 5. The device 110 (shown in FIGS. 1A-1C) may determine that the user 5 is using another device to access the book/content 7 (or that the book/content 7 is being presently displayed at the other device associated with the user 5), and may receive data, identifying the book/content 7, from the other device. Using the received data the device 110 may determine which book/content 7 the user 5 wants to read.

In some embodiments, the user 5 may use the system 100 to learn a new language, and the book/content 7 may be sentences in the language the user 5 wants to learn. In this case, the system(s) 120 may determine the identifier associated with the book/content 7 as a set of sentences or another collection of words (e.g., paragraphs). The set of sentences may be book/content 7 that the user 5 already read in the past or may be sentences that the user 5 should read to learn the new language. The user 5 may previously select a skill that is configured to teach a particular language to the user. Based on the selected skill, the book/content 7 to be read by the user may be determined and presented to the user 5 via a display of the device 110.

The system(s) 120 receives (134) data associated with the identifier. In some embodiments, the received data may be text data representing the book/content 7, for example, of the book/content 7 associated with the identifier or the set of sentences associated with the identifier. In other embodiments, the received data may be ASR token data representing the book/content 7 (e.g., in the situation where the content was originally embodied as audio data, such as an audio book). The system(s) 120 may receive the data from a skill system(s) 125 that may store and manage data (text data or token data) representing the book/content 7 of multiple different books.

The system(s) 120 may activate a microphone(s) of the device 110 to capture speech. The system(s) 120 may activate the microphone(s) in anticipation of the user 5 reading a portion of the book/content 7. The system(s) 120 may activate the microphone in response to receiving the input at step 130. In some embodiments, in anticipation of the user 5 reading the book/content 7, the system(s) 120 may enter a listening mode to capture speech from the user 5 without detecting a wakeword (such as "Alexa").

The system(s) 120 receives (138) input audio data corresponding to a first portion of the book/content 7. The input audio data may be speech provided by the user 5 and may represent the user 5 reading of a portion of the book/content 7, for example, a paragraph of the book/content 7, a page of the book/content 7, a sentence in the book/content 7 or set of sentences, etc.

The system(s) 120 determines (140) whether the input audio data corresponds to an entirety of the first portion of the book/content 7. For example, the system(s) 120 may identify, using the data received at step 134, the last few words of the first portion of the book/content 7, and may process the input audio data, as it is being captured, to identify that the user 5 read the last few words of the first portion, thus determining the user 5 has finished reading the first portion. If the user 5 has not finished reading the first portion, in other words, the input audio data does not correspond to the entirety of the first portion, then the system(s) 120 continues to receive the input audio data per step 138. If the user 5 is finished reading the first portion, in other words, the input audio data corresponds to the entirety of the first portion, then the system(s) 120 may deactivate the microphone of the device 110 to stop capturing speech.

Traditionally, the system(s) 120 may deactivate the microphone of the device 110 when the user 5 pauses or stops speaking, indicating that user 5 has finished providing a command to the device 110. While reading, the user 5 may pause between words, and the system(s) 120 does not want to deactivate the microphone before the user 5 is finished reading the first portion. Thus, as described above, the system(s) 120 may use the data representing the book/content 7 and the input audio data to determine when the user 5 is finished reading and to determine when to deactivate the microphone of the device 110. If the user finished reading the first portion, the system(s) 120 enters (142) a reading evaluation mode. In some embodiments, the system(s) 120 may start evaluating the captured input audio data, as described below, to determine reading evaluation data. In other embodiments, the system(s) 120 may begin evaluation of the input audio data as it is captured/received, before the user 5 even finished reading the first portion. In this case, the system(s) 120 entering the reading evaluation mode may indicate that the system(s) 120 can finish determining the reading evaluation data for the first portion and send the reading evaluation data to another component/system (e.g., content provider skill 290*b*/390*b*), so that the system(s) 120 may determine how to proceed in the next turn of the reading experience/interaction.

Referring to FIG. 1B, the system(s) 120 determines (144) reading evaluation data based on the input audio data and the first portion of the book/content 7. The reading evaluation data, in some embodiments, may indicate a number of words/tokens the user 5 deleted/omitted from the first portion of the book/content 7 while reading, a number of words the user 5 inserted/added to the first portion of the book/content 7 while reading, and/or a number of words the user 5 substituted with other words in the first portion of the book/content 7 while reading. The reading evaluation data may also or instead indicate a number of words the user 5 mispronounced. The reading evaluation data may also be based on a reading speed of the user 5, where the reading speed may depend on the number of words in the portion of the book/content 7 read by the user 5, the amount of time the user 5 spent reading that portion, an (average) amount of time a user of similar demographics (e.g., same age group, same education level, etc.) as the user 5 spends reading the number of words in that portion, etc. The reading evaluation data may be based on the amount time it takes the user 5 to recall a word(s) in the portion of the book/content 7.

To determine the reading evaluation data, the system(s) 120 may perform ASR processing using the input audio data to determine ASR output data, where the ASR output data may represent the words/tokens spoken by the user 5. The system(s) 120 may process (e.g., compare) the ASR output data with respect to the data (text data or token data) representing the first portion of the book/content 7, and based on the processing, the system(s) 120 may determine the reading evaluation data representing a number of deleted words/tokens, a number of inserted words/token, and/or a number of substituted words/tokens. To determine the reading evaluation data, the system(s) 120 may process the input audio data using a machine learning model(s) configured to perform phoneme-level alignment, and may determine a number of words mispronounced by the user 5 while reading the first portion of the book/content 7. As such, the reading evaluation data may represent a reading accuracy, a pronunciation accuracy and/or a reading comprehension of the user 5 based on reading the first portion of the book/content 7. In some embodiments, the reading evaluation data may be a score based on an average, a weighted average or another combination of the number of deleted words/tokens, the number of inserted words/tokens, the number of substituted words/tokens, and/or the number of mispronounced words.

The system(s) 120 determines (146) if the reading evaluation data satisfies a threshold condition. The threshold condition may be one or more conditions relating to the number of deleted words/tokens, the number of inserted words/tokens, the number of substituted words/tokens, and/or the number of mispronounced words. For example, the threshold condition may include a first number or percentage of deleted words, where if the number of deleted words/tokens represented in the reading evaluation data is more than the first number or percentage then the threshold condition is not satisfied. The threshold condition may include a second number or percentage of inserted words, where if the number of inserted words/tokens represented in the reading evaluation data is more than the second number or percentage than the threshold condition is not satisfied. The threshold condition may include a third number or percentage of substituted words, where if the number of substituted words/tokens represented in the reading evaluation data is more than the third number or percentage than the threshold condition is not satisfied. The threshold condition may include a fourth number or percentage of inserted words, where if the number of mispronounced words/tokens represented in the reading evaluation data is more than the fourth number or percentage than the threshold condition is not satisfied. In some embodiments, the threshold condition may be a threshold score, when the reading evaluation data is represented as a score.

In some embodiments, the threshold condition may be a predefined threshold condition based on industry-based standards for reading fluency. In some embodiments, the threshold condition may be based on an age and other demographic information of the user 5. For example, a first threshold condition may be used for a user of age 5, while a second threshold condition may be used for a user of age 10. In some embodiments, the threshold condition may be based on past reading evaluation data associated with the user 5. The threshold condition may be increased (requiring a higher reading accuracy) based on the user 5 reading well in the past. The threshold condition may be decreased (requiring a lower reading accuracy) based on the user 5 reading poorly in the past.

If the threshold condition is satisfied, the system(s) 120 determines (148) to output a second portion of the content. In this case, the system(s) 120 may determine to "read" the next portion (paragraph, page or sentence) of the book/content 7. In "reading" the next portion, the system(s) 120 performs (150) TTS processing on the second portion of the content to determine output audio data. The system(s) 120 may use the data (text data or token data) representing the second portion of the book/content 7 (received in step 132) to generate the output audio data. The output audio data, in this case, may be synthesized speech representing the second portion of the book/content 7. The system(s) 120 sends (152) the output audio data to the device 110. The device 110 may output the synthesized speech, thus "reading" the second portion of the book/content 7. In this manner, the system 100 may read along with the user 5 and take turns in reading portions of the book/content 7, where one portion is read by the user 5 and the next/another portion is "read" by the device 110.

If the threshold condition is not satisfied (at step 146), the system(s) 120 may determine (154) the first portion of the book/content 7 is to be reread. In this case, based on the reading evaluation data the system(s) 120 may determine that the user 5 has a low reading accuracy or a low reading comprehension with respect to the first portion of the book/content 7, and that rereading the first portion may help the user 5 understand the content better or provide the user 5 practice in reading. The system(s) 120 sends (156) to the device 110 output data representing a request to reread the first portion of the book/content 7. The output data may be output audio data representing synthesized speech corresponding to the request to reread the first portion of the book/content 7. The output data may be text data displayed at the device 110 representing the request to reread the first portion of the book/content 7. In some embodiments, based on the reading evaluation data, the system(s) 120 may determine to "read" the first portion of the book/content 7 to help the user 5 understand the first portion. In some other embodiments, the system(s) 120 may determine to "read" part of the first portion of the book/content 7 based on the reading evaluation data, where the part may be one or two sentences that the user 5 had particular difficulty reading.

Alternatively, if the threshold condition is not satisfied (at step 146), the system(s) 120 may determine (160) to decrease an amount of the content to be read during a turn. In this case, based on the reading evaluation data the system(s) 120 may determine that the user 5 may benefit from reading smaller portions than previously read. For example, if the user 5 previously read a page, the system(s) 120 may determine the user 5 should read a paragraph. For further example, if the user 5 previously read a paragraph, the system(s) 120 may determine the user 5 should read a sentence. Reading smaller portions at a time may improve the reading evaluation data for the user 5. For the next turn, the system(s) 120 may request the user 5 to read a smaller portion second portion of the book/content 7 or may request the user 5 to read a second portion of the book/content 7 that is smaller than the first portion (for example, if the first portion was a page, then the second portion may be a paragraph). The system(s) 120 sends (162), to the device 110, output data representing a request to read a second portion of the book/content 7, where the second portion is smaller than the first portion. The second portion may be smaller than the first portion of the book/content 7 in terms of the number of words in the respective portions or the number of sentences in the respective portions.

To track the turn-based reading experience, the system 100 may use a session and a session identifier. As used herein, a session or session identifier refers to various related user inputs and system outputs, for example, inputs and output relating to reading of the content by a user and the system. The system 100 may associate a session identifier with the request to read along from the user 5, and may associate subsequent incoming inputs from the user 5 (e.g., reading the book/content 7) and subsequent outputs from the system 100 with the session identifier. In some embodiments, the reading evaluation data for portions of the book/content 7 read by the user 5 during the instant session may also be associated with the session identifier. The reading evaluation data may further be associated with a content identifier identifying the content 7 and/or portion of the content 7 read by the user 5.

In some embodiments, the system(s) 120 may determine the portion of the book/content 7 being read by the user 5 based on a version of the book/content 7. Different versions/prints of a physical book/content 7 may have different paginations and paragraphs. If the book/content 7 is digitally accessed, then the font size and font type of the displayed book/content 7 may affect which words are on each displayed page. The data received in step 134 may be based on the version/print of the physical book/content and the font size/type of the displayed book/content. Additionally or alternatively, to determine which portion/page/paragraph the user 5 is reading, the system(s) 120 may confirm with the user 5 a few words from the portion that the system(s) 120 believes the user 5 will be reading from.

In some embodiments, the user 5 may read a portion of the book/content 7 other than the one expected by the system(s) 120. For example, the system(s) 120 may be expecting the user 5 to read page 2, but the user 5 instead reads page 3. In this case, the system(s) 120 may determine that the user 5 is reading from another portion of the book/content 7, and using the data received in step 134, the system(s) 120 may determine which portion of the book/content 7 the user 5 is reading. For example, the system(s) 120 may process the input audio data (received in step 138) to determine which sequence of words the user 5 is saying and where (e.g., which page, paragraph, etc.) within the book/content 7 those sequence of words appear. In some embodiments, after the user 5 is finished reading the portion, the system(s) 120 may output synthesized speech confirming or asking the user 5 where the user 5 was reading from. For example, the system(s) 120 may output "Okay, did you just read page 3?" or "Which page did you just read?"

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language user input. The device 110 may determine text data 213 representing the typed natural language user input, and may send the text data 213 to the system 120, wherein the text data 213 is received by the orchestrator component 230.

The orchestrator component 230 may send the text data 213 or ASR output data output, depending on the type of natural language user input received, to a NLU component 260. The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 225 via one or more skill components 290. As used herein, a "skill" may refer to a skill component 290, a skill system 225, or a combination of a skill component 290 and a skill system 225. A skill may be configured to execute with respect to NLU output data. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The foregoing describes illustrative components and processing of the system 120. In at least some embodiments, the device 110 may be configured to include some or all of the components, and perform some or all of the processing, of the system 120 described above. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU component 355 (an ASR component 350 and an NLU 360), similar to the manner discussed above with respect to the SLU component 255 (or ASR component 250 and the NLU component 260) of the system 120. The device 110 may also internally include, or otherwise have access to, other components such as one or more skill components 390 capable of executing commands based on NLU output data or other results determined by the device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 225.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 225. For example, a skill system 225 may be located in a remote environment (e.g., separate location) such that the device 110 may only communicate with the skill system 225 via the network(s) 199. However, the disclosure is not limited thereto. For example, in at least some embodiments, a skill system 225 may be configured in a local environment (e.g., home server and/or the like) such that the device 110 may communicate with the skill system 225 via a private network, such as a local area network (LAN).

As used herein, a "skill" may refer to a skill component 390, a skill system 225, or a combination of a skill component 390 and a skill system 225.

FIG. 4 is a conceptual diagram of components of a system that may be used to process inputs representing reading of content. The system may receive input audio data 402 representing speech from the user 5 captured by the device 110. Using the components shown in FIG. 4, the system may determine whether the input speech from the user 5 represents a spoken command or reading of content. A spoken command may be an input unrelated to reading of content as described in relation to FIGS. 1A-1C. The user 5 may expect the system to respond to the spoken command by performing an action or presenting an output responsive to the spoken command. For example, a spoken command may be "turn on the lights" or "stop" (indicating to stop the read along experience). In some cases, the user 5 may say "stop" while reading the content when the content includes the word "stop." Using the components shown in FIG. 4, the system may determine whether the input audio data relates to a spoken command or reading of content, and may process the input audio data 402 accordingly.

Assuming that a request to read along is received by the system prior to receipt of the input audio data 402, and that a read along experience is presently active, the input audio data 402 is processed by the ASR evaluate component 245/345 (instead of the ASR component 250/350). The ASR evaluate component 245/345 may be configured in a similar manner as the ASR component 250/350, in that the ASR evaluate component 245/345 may be configured to identify words spoken by the user 5 and represented in the input audio data 402. One of the differences between the ASR component 250/350 and the ASR evaluate component 245/345 may relate to when the component detects the end of the input (i.e. detects when the user 5 is finished providing the speech input). For example, the ASR component 250/350 may expect the speech input to be of a certain (first) length in terms of seconds. The ASR component 250/355 may expect silence for a (first) period of time after the user 5 is finished providing the speech input. While the ASR evaluate component 245/345 may expect the speech input to be of a certain (second) length in terms of seconds, where the second length may be greater than the first length based at least on the user 5 reading a paragraph or a page of a book, for example. The ASR evaluate component 245/345 may expect silence for a (second) period of time after the user 5 is finished providing the speech input, where the second period of time may be greater than the first period of time based at least on the user 5 pausing between sentences while reading a portion of a book.

In some embodiments, the ASR evaluate component 245/345 may be configured for (trained using) words included in a plurality of books and other type of content, where the plurality of books and other type of content may be accessible using one or more skill components 290/390. As such, the ASR evaluate component 245/345 may be configured to recognize certain sequences of words, which the ASR component 250/350 may not be configured to recognize. For example, the ASR evaluate component 245/345 may be able to identify the sequence of words "the sky is glue" as something that the user 5 is more likely to say, while the ASR component 250/350 may identify the sequence of words "the sky is blue" as being something that the user 5 is more likely to say.

The ASR evaluate component 245/345 may output ASR output data 420 corresponding to the input audio data 402. The ASR evaluate component 245/345 may employ one or more language models. The ASR output data 420 may be similar to the ASR output data of the ASR component 250/350. For example, the ASR output data 420 may include one or more token data representing a word/sub-word included in the input audio data 402. The ASR output data 420 may also include one or more confidence scores indicating the ASR evaluate component 245/345 confidence in determining the token data. In some embodiments, the ASR output data 420 may be word embeddings corresponding to the words/sub-words included in the input audio data 402.

A phoneme alignment component 410 may also process the input audio data 402, while the read along experience is active. The phoneme alignment component 410 may be configured to determine proper positioning of a sequence of phonemes in relation to the input audio data 402. The phoneme alignment component 410 may output phoneme output data 415 representing the phonemes included in the input audio data 402. The phoneme output data 415 may also include confidence scores indicating the phoneme alignment component 410 confidence in determining the phonemes. In some embodiments, the phoneme alignment component 410 may employ one or more ML models to determine the phoneme output data 415. In some embodiments, the phoneme alignment component 410 may process the input audio data 402 and data (e.g., text data, token data, etc.) representing the portion (e.g., page, paragraph, etc.) of the content that the user 5 is expected to read. In some embodiments, the phoneme alignment component 410 may be configured to recognize commonly mispronounced words (e.g., based on a user age, a user reading ability, etc.).

The ASR output data 420 may be processed by the NLU component 260/360 as described above in relation to FIGS. 2 and 3 to output NLU data 430 corresponding to the input audio data 402. The NLU component 260/360 may process the ASR output data 420 to determine at least an intent corresponding to the input audio data 402, and the determined intent may be included in the NLU data 430. The NLU data 430 may include one or more NLU hypotheses corresponding to the input audio data 402. The NLU data 430 may also include one or more NLU confidence scores representing the NLU component 260/360 confidence in determining the NLU hypotheses.

The ASR output data 420 and the phoneme output data 415 may be processed by the learning/reading skill 290a/390a to determine reading evaluation data 435. The learning/reading skill 290a/390a may determine the reading evaluation data 435 using data representing the content the user 5 is expected to read. The reading evaluation data 435 may be based on a number of words (and which words) the user 5 deleted while reading the expected content portion, a number of words (and which words) the user 5 inserted while reading the expected content, a number of words (and which words) the user 5 substituted while reading the expected content, and a number of words (and which words) the user 5 mispronounced while reading the expected content. Using the foregoing information, the learning/reading skill 290a/390a may determine the reading evaluation data 435 as a sum, an average, a weighted average or another type of aggregation of the numbers. In some embodiments, the reading evaluation data 435 may also be based on the confidence scores in the ASR output data 420, such that if the ASR evaluate component 245/345 is not confident in identifying a particular word, then that word may not contribute to the reading evaluation data 435, or the weight assigned to that word (in determining the reading evaluation data) may be lower than another word that was identified with high confidence by the ASR evaluate component 245/345.

The request routing component 440 may process the NLU data 430 and the reading evaluation data 435 to determine if the input audio data 402 represented a spoken command or reading of content. For example, if the NLU data 430 represents a low confidence score for an intent(s) and the reading evaluation data 435 represents a high reading accuracy, then the request routing component 440 may determine that the input audio data 402 corresponds to reading of content. In another example, if the NLU data 430 represents a high confidence score for an intent(s) and the reading evaluation data 435 represents a high reading accuracy, then the request routing component 440 may determine that the input audio data corresponds to reading of content. In yet another example, if the NLU data 430 represents a high confidence score for an intent(s) and the reading evaluation data 435 represents a low reading accuracy, then the request routing component 440 may determine that the input audio data corresponds to a spoken command. In this case, the low score of reading evaluation data 435 may indicate that the input audio data 402 does not include words that are part of the expected content, and the high score of the NLU data 430 may indicate that the input is a command instead. In yet another example, if the NLU data 430 represents a low confidence score for an intent(s) and the reading evaluation data 435 represents a low reading accuracy, the request routing component 440 may determine that the input audio data corresponds to reading of content. In this case, the low score of reading evaluation data 435 and the low confidence of the NLU data 430 may indicate that the user 5 is reading something other than the expected content, for example, from a different paragraph or page than expected. The low confidence of the NLU data 430 indicates that the input is not a spoken command, and that it is more likely that the user 5 is reading.

In some embodiments, the reading evaluation data 435 may be based on the amount of time the user 5 spends reading the portion of the content. For example, the learning/reading skill 290a/390a may process the amount of time spent reading by the user 5 with a threshold amount of time, where the threshold amount of time may be based on the number of words in the portion of the content, the user's age, the user's past/historic reading evaluation data, etc. In some embodiments, the reading evaluation data 435 may include one or more confidence scores, one or more labels identifying mispronounced words, misread words, misspoken words, misidentified words, etc. In some embodiments, the reading evaluation data may also be based on a reading speed of the user 5, where the reading speed may depend on the number of words in the portion of the book/content 7 read by the user 5, the amount of time the user 5 spent reading that portion, an (average) amount of time a user of similar demographics (e.g., same age group, same education level, etc.) as the user 5 spends reading the number of words in that portion, etc. The reading evaluation data may be based on the amount time it takes the user 5 to recall a word(s) in the portion of the book/content 7.

If the request routing component 440 determines that the input audio data 402 corresponds to a spoken command, then the NLU data 430 and/or other data corresponding to the input audio data 402 may be routed to a skill(s) 290/390 that is determined to be capable of responding to the spoken command. For example, if the NLU data includes a <Play-Music> intent, the NLU data may be routed to a music skill. For further example, if the NLU data includes a <BookTrip> intent, the NLU data may be routed to a travel skill. If the request routing component 440 determines that the input audio data 402 corresponds to reading of content, then the reading evaluation data and/or other data corresponding to the input audio data 402 may be routed to the content provider skill 290b/390b.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Components of a system that may be used to perform unit selection, parametric TTS processing, and/or model-based audio synthesis are shown in FIG. 5A. As shown in FIG. 5A, the TTS component/processor 280 may include a TTS front end 516, a speech synthesis engine 518, TTS unit storage 572, TTS parametric storage 280, and a TTS back end 534.

The TTS unit storage 572 may include, among other things, voice inventories 578a-288n that may include pre-recorded audio segments (called units) to be used by the unit selection engine 530 when performing unit selection synthesis as described below. The TTS parametric storage 280 may include, among other things, parametric settings 568a-268n that may be used by the parametric synthesis engine 532 when performing parametric synthesis as described below. A particular set of parametric settings 568 may correspond to a particular voice profile (e.g., whispered speech, excited speech, etc.).

In various embodiments of the present disclosure, model-based synthesis of audio data may be performed using by a speech model 522 and a TTS front-end 516. The TTS front-end 516 may be the same as front ends used in traditional unit selection or parametric systems. In other embodiments, some or all of the components of the TTS front end 516 are based on other trained models. The present disclosure is not, however, limited to any particular type of TTS front end 516. The speech model 522 may be used to synthesize speech without requiring the TTS unit storage 572 or the TTS parametric storage 280, as described in greater detail below.

The TTS front end 516 transforms input data 502 (from, for example, an application, a skill, such as the learning/reading skill 290a/390a, a user, a device, or other sources) into a symbolic linguistic representation, which may include linguistic context features such as phoneme data, punctuation data, syllable-level features, word-level features, and/or emotion, speaker, accent, or other features for processing by the speech synthesis engine 518. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input data 502, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 516 may also process other input data 515, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The input data 502 (or other input data 515) may include tags indicating which attributes to apply to which portions of the text. The tags may be included in the input data 502 and/or the text for a TTS request may be accompanied by separate metadata indicating what text should be whispered (or have some other indicated audio characteristic). The speech synthesis engine 518 may compare the annotated phonetic units models and information stored in the TTS unit storage 572 and/or TTS parametric storage 280 for converting the input text into speech. The TTS front end 516 and speech synthesis engine 518 may include their own controller(s)/processor(s) and memory or they may use the controller/processor and memory of the server 120, device 110, or other device, for example. Similarly, the instructions for operating the TTS front end 516 and speech synthesis engine

518 may be located within the TTS component 280, within the memory and/or storage of the server 120, device 110, or within an external device.

The input data 502 may correspond to the portion of the content the system is "reading" to the user 5. The input data 502 may correspond to other outputs presented by the system to the user 5, such as requests to read a portion of the content, feedback on how the user is reading, etc. In some embodiments, a portion(s) of the reading evaluation data 435 may be included in the other data 515, or the other data 515 may be based on the reading evaluation data 435, where the other data 515 may indicate a particular reading level/proficiency, which may influence how content is "read" by the system. For example, if the reading evaluation data 435 indicates the user 5 has a low reading level/proficiency, then the system may "read" content at a slower pace. In this case, the other data 515 may include SSML tags or may indicate to the TTS component 280/380 to apply SSML tags (e.g., prosody slow, speed=slow, etc.) to the input data 502 so that output audio data 590 represents the content being spoken at a slower rate. In another example, if the reading evaluation data 435 indicates the user has a high reading level/proficiency, then the system may "read" the content at a normal rate or faster rate. In this case, the other data 515 may include SSML tags or may indicate to the TTS component 280/380 to apply SSML tags (e.g., prosody normal, prosody fast, speed=normal, speed=fast, etc.) to the input data 502 so that output audio data 590 represents the content being spoken at a normal rate or a faster rate. The input data 502 input into the TTS component 280 may be sent to the TTS front end 516 for processing. The front-end may include components for performing text normalization, linguistic analysis, linguistic prosody generation, or other such components. During text normalization, the TTS front end 516 may first process the text input and generate standard text, converting such things as numbers, abbreviations (such as Apt., St., etc.), symbols ($, %, etc.) into the equivalent of written out words.

During linguistic analysis, the TTS front end 516 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 572. The linguistic analysis performed by the TTS front end 516 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 516 may then perform linguistic prosody generation where the phonetic units are annotated with desired prosodic characteristics, also called acoustic features, which indicate how the desired phonetic units are to be pronounced in the eventual output speech. During this stage the TTS front end 516 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 516, which may be referred to as a symbolic linguistic representation, may include a sequence of phonetic units annotated with prosodic characteristics. This symbolic linguistic representation may be sent to the speech synthesis engine 518, which may also be known as a synthesizer, for conversion into an audio waveform of speech for output to an audio output device and eventually to a user. The speech synthesis engine 518 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 518 may perform speech synthesis using one or more different methods. In one method of synthesis called unit selection, described further below, a unit selection engine 530 matches the symbolic linguistic representation created by the TTS front end 516 against a database of recorded speech, such as a database (e.g., TTS unit storage 572) storing information regarding one or more voice corpuses (e.g., voice inventories 578*a-n*). Each voice inventory may correspond to various segments of audio that was recorded by a speaking human, such as a voice actor, where the segments are stored in an individual inventory 578 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 530 may then use the information about each unit to select units to be joined together to form the speech output.

The unit selection engine 530 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 520) to form output audio data 590 representing synthesized speech. Using all the information in the unit database, a unit selection engine 530 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 532, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 520) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 280 based on feedback of the results of TTS processing, thus enabling the TTS component 280 to improve speech recognition.

The TTS storage component 280 may be customized for an individual user based on his/her individualized desired speech output. In particular, the speech unit stored in a unit database may be taken from input audio data of the user speaking. For example, to create the customized speech output of the system, the system may be configured with multiple voice inventories 578a-578n, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 578 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 568) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 530 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 530. As part of unit selection, the unit selection engine 530 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 572 or in another storage component. For example, different unit selection databases may be stored in TTS unit storage 572. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 518 may attempt to select a unit in the speech unit database that most closely matches the input text (including both phonetic units and prosodic annotations). Generally the larger the voice corpus/ speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 532 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 516.

The parametric synthesis engine 532 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 518, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/ stochastic model) vocoders, or others.

In addition to calculating potential states for one audio waveform as a potential match to a phonetic unit, the parametric synthesis engine 532 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 532 may lead to a number of potential audio output sequences. Based on the acoustic model and other potential models, the potential audio output sequences may be scored according to a confidence level of the parametric synthesis engine 532. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 568, which may represent acoustic settings matching a particular parametric "voice", may be used by the speech model 522 to ultimately create the output audio data 590.

When performing unit selection, after a unit is selected by the unit selection engine 530, the audio data corresponding to the unit may be passed to the synthesis component 520. The synthesis component 520 may then process the audio data of the unit to create modified audio data where the modified audio data reflects a desired audio quality. The synthesis component 520 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 520 may process the audio data for that unit to create a modified unit audio data. The modified unit audio data may then be concatenated to form the output audio data 590. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 585 may be output along with the output audio data 590 so that an ultimate playback device (e.g., device 110) receives instructions for playback that can assist in creating the desired output audio. Thus, the other output data 585 may include instructions or other data indicating playback device settings (such as volume, playback rate, etc.) or other data indicating how output audio data including synthesized speech should be output. For example, for whispered speech, the output audio data 590 may include other output data 585 that may include a prosody tag or other indicator that instructs the device 110 to slow down the playback of the output audio data 590, thus making the ultimate audio sound more like whispered speech, which is typically slower than normal speech. In another example, the other output data 585 may include a volume tag that instructs the device 110 to output the speech at a volume level less than a current volume setting of the device 110, thus improving the quiet whisper effect.

FIG. 5B illustrates an embodiment of the speech model 522. The speech model may include an encoder 550, attention mechanism 552, and a decoder 554. This arrangement of components may be referred to as a sequence-to-sequence model. The encoder 550 and/or decoder 554 may be neural networks having one or more layers. These layers may consist of one or more nodes; each node may receive input data or the output of a node from a previous layer and process that data in accordance with one or more model weights. For example, a node may multiply a value of an input with a model weight to produce an output. The neural networks may be deep neural networks (DNNs), convolutional neural networks (CNNs), and/or recurrent neural networks (RNNs). The neural networks may be trained using training data, such as recordings of utterances and corresponding text.

The encoder 550 may receive the input data 502. The encoder 550 may encode this information into a context vector, which is input to the decoder 554. Optionally, an attention mechanism 552 may receive this context vector as well as outputs of other nodes of the encoder 550 and weight (e.g., "attend") different outputs of the encoder 550 differently. The decoder 554 may then generate output audio data 590 (which may include the response data) using the context vector and/or output of the attention mechanism 552.

FIGS. 6A-6D are a signal flow diagram illustrating how a request to read along may be processed. While the processing of FIG. 6A-6D described herein relate to a book, it will be appreciated that the present disclosure is not limited thereto, and that the processing may be performed with respect to non-book content, such as articles, magazines, etc. The device 110 may be local to the user 5 (not shown here). The device 110 may send an input from the user 5, where the input is a request to read along (602), to the SLU component 255/355. The user 5 may speak the utterance "Alexa, lets read a book" or "Alexa, I want to read along." In some embodiments, the orchestrator 230/LRO 328 may route the request to the SLU component 255/355. In some embodiments, the system(s) 120 may perform user/speaker recognition using the user recognition component 295/395 to determine a user profile identifier associated with the user 5. For example, multiple users may interact with the device 110 for a read along experience, and the system(s) 120 may determine which particular user provided the request in step 602. In some embodiments, the system(s) 120 may use the user profile identifier to retrieve past/historic reading evaluation data for the user 5.

The SLU component 255/355 may process the input and determine (604) intent data corresponding to the input, where the intent data may represent Intent: StartReadAlongIntent. Based on the intent data, the SLU component 255/355 (via the orchestrator 230/LRO 328 in some embodiments) may determine to invoke the learning/reading skill 290a/390a (606).

The learning/reading skill 290a/390a may be configured to facilitate a turn-based reading of a book or other type of content, and may determine reading evaluation data (as described herein above with respect to FIG. 4). The learning/reading skill 290a/390a may also be configured to invoke the ASR evaluate component 245/345 of the SLU component 255/355 to process speech, provided by the user 5, representing reading of content. To start the read along experience, the learning/reading skill 290a/390a may send an output to the device 110, where the output includes a request for a book identifying information (608), so that the learning/reading skill 290a/390a may identify which book the user 5 wants to read. For example, the device 110 may output the following synthesized speech: "Great, what book would you like to read?" In response to the output, the user 5 may say "Peanuts." The device 110 may send book identifying data (610) (for example, book name: "peanuts") to the learning/reading skill 290a/390a (via the orchestrator 230/LRO 328, in some embodiments). The book identifying data may include one or more of: a book name, a book author, a book volume, a book series name, etc.

The learning/reading skill 290a/390a may determine (612) a book match in a catalog for a user profile identifier associated with the user 5. The catalog for the user profile identifier may include a list of books or other type of content that the user 5 may have access to via subscriptions, downloads, purchases, free content, etc. The catalog may also indicate a content provider skill associated with the book or other type of content, via which the user 5 can access the book or other type of content. The book match may be determined based on processing the book identifying data with respect to the catalog to determine a book identifier that matches the requested book. For example, the learning/reading skill 290a/390e may determine the book identifier "Peanuts 5 minute stories" as corresponding to the requested book. The book identifier may be one or more of a book title that is stored in the catalog, an alphanumeric value associated with a book in the catalog, an author associated with a book in the catalog, a book series associated with a book in the catalog, a book volume number associated with a book in the catalog, etc. The learning/reading skill 290a/390a may send an output to the device 110 to confirm the book name (or other identifier) (614) with the user 5. The user 5 may confirm that the book name (or other identifier) matches the requested book, and the device 110 may send data representing the confirmation (616) to the learning/reading skill 290/390a. The user 5 may confirm the book name by providing a speech input, a text input, a gesture, an input via a touchscreen interface, a nod, and other types of input. The data sent by the device 110 representing the confirmation may be audio data, text data, image data capturing the gesture or node, text data representing the input via the touchscreen interface, etc., and the data may be processed using ASR and/or NLU to determine that the user 5 confirmed the book name.

Figure 6B:
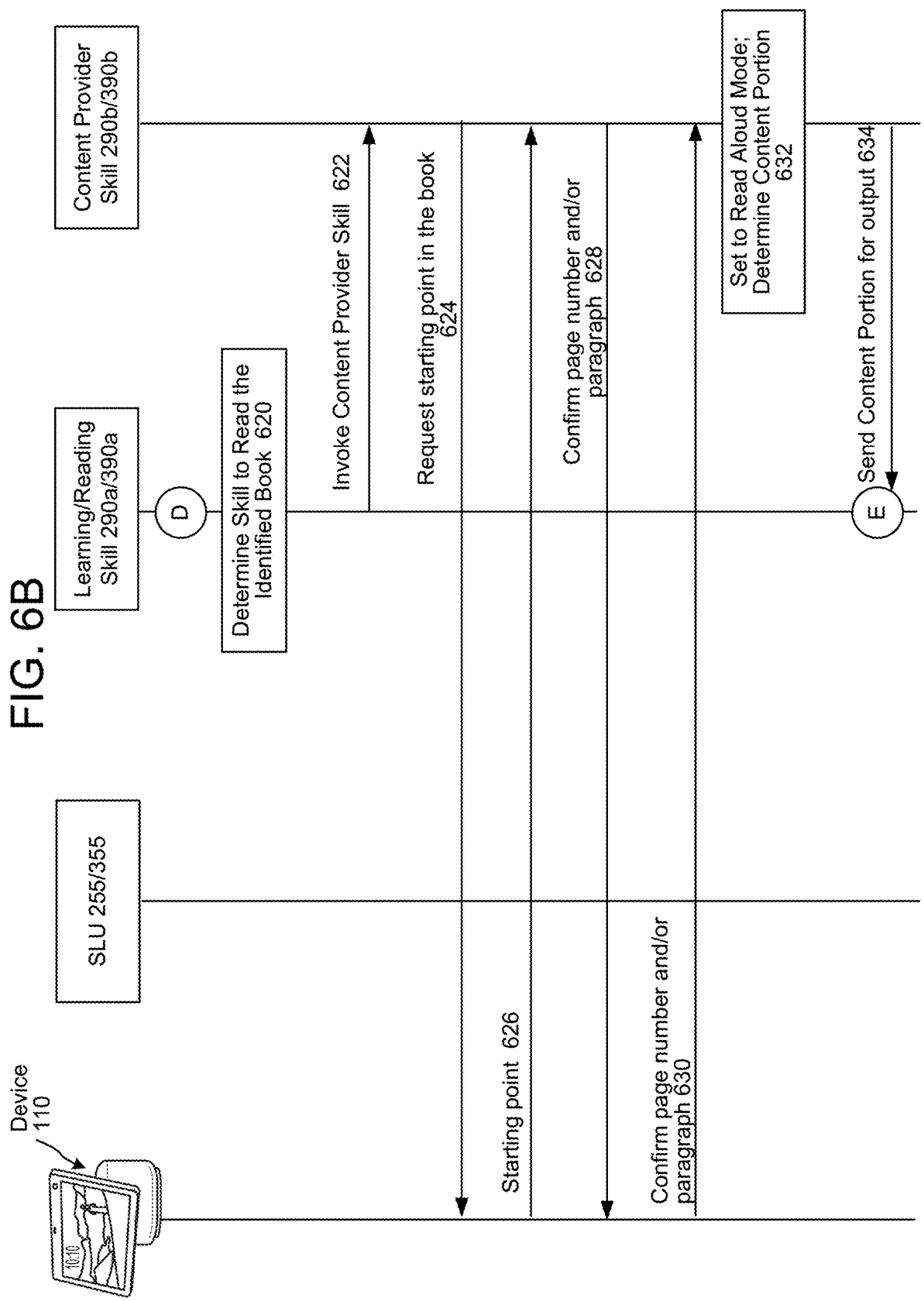

Referring to FIG. 6B, the learning/reading skill 290a/390a may determine (620) a content provider skill 290b/390b to read the identified book. The learning/reading skill 290a/390a may determine the content provider skill 290b/390b based on the catalog indicating that the content provider skill 290b/390b is capable of providing content associated with the identified book. For example, a first book may only be available for access via a first skill 290b/390b, while a second book may only be available for access via a second skill 290c/390c. Also, the user profile identifier may only be authorized to access (based on subscriptions, downloaded skills, parental controls, etc.) the first skill 290b/390b, and may not be authorized to access the second skill 290c/390c.

The learning/reading skill 290a/390a may invoke the content provider skill 290b/390b (622), and may send data corresponding to the identified book and/or context data corresponding to the interaction with the user 5 (e.g., profile data associated with the user 5, device information associated with the user 5, location associated with the user 5, etc.). The content provider skill 290b/390b may send an output to the device 110 requesting a starting point in the book (624). For example, the device 110 may output "Great Choice. Where do you want to start?" In response to which, the user 5 may say "Chapter 2." The device 110 may send the input representing the starting point (626) to the content provider skill 290b/390b (via the orchestrator 230/LRO 328, in some embodiments). The content provider skill 290b/390b may determine a page number and/or paragraph based on the starting point provided by the user 5, and may send an output to the device 110 to confirm the page number and/or paragraph (628) with the user 5. In confirming the page number and/or the paragraph, the content provider skill 290b/390b may include a few words from where the content provider skill 290b/390b thinks the user wants to start reading. For example, the device 110 may output "on page 12, starting at go fly a kite?" In response to which the user 5 may say "yes," and the device 110 may send an input confirming the page number and/or paragraph (630) to the content provider skill 290*b*/390*b* (via the orchestrator 230/LRO 328, in some embodiments).

In this example case, the device 110 may take the first reading turn, and may "read" a first portion of the book. The content provider skill 290*b*/390*b* may set (632) the mode to "read aloud" mode (e.g., set a value in a data structure stored by the content provider skill 290*b*/390*b*), and may determine (632) the content portion to be "read" aloud by the device. The content provider skill 290*b*/390*b* may determine the content portion to be one paragraph or one page of the book starting at the starting point. The content portion may be based on the amount of content on a page of the book. The content portion may be based on the age of the user 5. The content portion may be based on past reading evaluation data associated with the user 5 (and/or associated with the book identifier for the user 5). The content portion may be based on a predetermined portion by the content provider skill 290*b*/390*b*. The content provider skill 290*b*/390*b* may send (634) data representing the determined content portion to the learning/reading skill 290*a*/390*a* for output. The data representing the determined content portion may be text data, token data or other type of data representing the content in the page or paragraph determined to be "read" by the device 110.

Referring to FIG. 6C, the learning/reading skill 290*a*/390*a* may determine (636) output audio data representing the content portion. The learning/reading skill 290*a*/390*a* may invoke the TTS component 280/380 (via the orchestrator 230/LRO 328, in some embodiments) to perform TTS processing using the data received from the content provider skill 290*b*/390*b* to determine the output audio data. The output audio data may, thus, represent synthesized speech "reading" the content portion. The learning/reading skill 290*a*/290*b* may send data representing a particular output speech profile to the TTS component 280/380 to be used when generating the output audio data, so that certain type of prosody, emphasis, emotions, and other speech/voice patterns may be applied in converting the content portion to the output audio data. The learning/reading skill 290*a*/390*b* may insert one or more speech synthesis markup language (SSML) tags in the data (text data, token data, etc.) received from the content provider skill 290*b*/390*b*, so that appropriate prosody, emphasis, emotions and other speech/voice patterns may be applied. For example, the learning/reading skill 290*a*/390*a* may determine input data for the TTS component 280 as "Let's go fly a <prosody speed = "slow">kite</prosody>." In some embodiments, the learning/reading skill 290*a*/290*e* may insert a preamble prior to the content portion in the TTS component input data, such as "Great, I'll start reading." Thus, the preamble may be included in the output audio data. The learning/reading skill 290*a*/390*a* may send (638) the output audio data to the device 110.

After the device 110 outputs the output audio data, the content provider skill 290*b*/390*b* regains controls (640) of the device 110, due to the turn-based reading experience. The content provider skill 290*b*/390*b* prepares for the next turn, and may set (642) the mode to evaluate mode, and may determine (642) an expected content portion representing the next portion (page or paragraph) of the book that the user 5 is expected to read. The content provider skill 290*b*/390*b* may send data (text data, token data, or other type of data) representing the expected content portion to the learning/reading skill 290*a*/390*a* (644).

The learning/reading skill 290*a*/390*a* may invoke the ASR evaluate component 245/345 (646) at the SLU component 255/355, so that a subsequent incoming utterance captured by the device 110 is processed by the ASR evaluate component 245/345, instead of the ASR component 250/350. The learning/reading skill 290*a*/390*a* may send an output to the device 110 requesting the user 5 starts reading (658). The request may include a point where the user 5 should start reading. For example, the device 110 may output "Why don't you read the next page starting with Charlie Brown." In response to which the user 5 may start reading the next page in the book. The microphone(s) of the device 110 may be activated, to capture speech, after the output requesting the user 5 to read is presented. In some embodiments, the device 110 may be set to a listening mode to capture speech after the output requesting the user 5 to read is presented. In the listening mode, the device 110 may be able to capture speech and process the corresponding audio data without detecting a wakeword in the speech. Referring to FIG. 6D, the device 110 may send input audio data (660) to the SLU component 255/355, where the input audio data represents the user 5 reading the next portion of the book.

The SLU component 255/355 may detect (662) an end of the input received from the user 5. In some embodiments, the SLU component 255/355 may detect the end of the input based on silence from the user 5 for a (predefined) period of time, where the period of time may be longer than the period of time the user 5 may pause (for example, between sentences) while reading. In this case, the user may have stopped reading mid-way through the expected content. In some embodiments, the end of the input may be detected based on receiving one or more of the last words, of the expected content portion, in the input audio data. In some embodiments, the device 110 microphone may be deactivated to stop capturing speech. In some embodiments, the listening mode at the device 110 may be disabled. The SLU component 255/355 may evaluate (664) the input audio data using the ASR evaluate component 245/345 (rather than the ASR component 250). The ASR evaluate component 245/345 may send ASR output data to the learning/reading skill 290*a*/390*a*. The ASR output data may include token data representing words/sub-words identified in the input audio data. The ASR output data may also include confidence scores indicating the ASR evaluate component's confidence in determining token data representing words/sub-words in the input audio data. In some embodiments, the input audio data may also be processed by a ML model configured to perform phoneme alignment, and phoneme output data (generated by the ML model) may also be sent to the learning/reading skill 290*a*/390*a*. The phoneme output data may represent the user 5's pronunciation of words.

The learning/reading skill 290*a*/390*a* may determine (668) reading evaluation data using the ASR output data and the expected content portion. The learning/reading skill 290*a*/390*a* may process (e.g., compare) the data (text data or token data), received from the content provider skill 290*b*/390*b*, representing the expected content portion, with respect to the ASR output data and the phoneme output data. Based on such processing, the learning/reading skill 290*a*/390*a* may determine a number of words/tokens (and which words/tokens) the user 5 deleted while reading the expected content portion, a number of words/tokens (and which words/tokens) the user 5 inserted while reading the expected content portion, a number of words/tokens (and which words/tokens) the user 5 substituted while reading the expected content portion, and a number of words/tokens (and which words/tokens) the user 5 mispronounced while reading the expected content portion. Using the foregoing information, the learning/reading skill 290*a*/390*a* may determine the reading evaluation data as a sum, an average, a weighted average or another type of aggregation of the numbers. In some embodiments, the reading evaluation data may also be based on the confidence scores in the ASR output data, such that if the ASR evaluate component 245/345 is not confident in identifying a particular word, then that word may not contribute to the reading evaluation data, or the weight assigned to that word (in determining the reading evaluation data) may be lower than a weight of another word that was identified with high confidence by the ASR evaluate component 245/345.

The learning/reading skill 290*a*/390*a* may send the reading evaluation data to the content provider skill 290*b*/390*b* (670). The content provider skill 290*b*/390*b* may process the reading evaluation data, and may determine (672) an output for the next turn based on the reading evaluation data. For example, if the reading evaluation data indicates that the user 5 has a low reading accuracy or a low reading comprehension of the expected content portion, then the content provider skill 290*b*/390*b* may request the user 5 to read the expected content portion again. In another example, if the reading evaluation data indicates that the user 5 has a low reading accuracy or a low reading comprehension of the expected content portion, then the content provider skill 290*b*/390*b* may "read" the expected content portion to the user 5 (by outputting synthesized speech representing the expected content portion). In yet another example, if the reading indicates that the user 5 mispronounced a particular word or had difficulty reading the particular word, then the content provider skill 290*b*/390*b* may "read" that word to the user 5. In yet another example, if the reading evaluation data indicates that the user 5 has a low reading accuracy or a low reading comprehension of the expected content portion, then the content provider skill 290*b*/390*b* may request the user 5 to read smaller portions of the book, such as "instead of reading the whole page, let's just read the first paragraph on this page." In yet another example, if the reading evaluation data indicates that the user 5 a high reading accuracy or a high reading comprehension of the expected content portion, then the content provider skill 290*b*/390*b* may "read" the next portion (page or paragraph) of the book.

In some embodiments, the content provider skill 290*b*/390*b* may provide feedback (as the output in step 672) to the user 5 based on the reading evaluation data. The content provider skill 290*b*/390*b* may determine feedback data (e.g., text data representing the feedback), and provide the feedback data as input data 502 to the TTS component 280/380. For example, the system may output synthesized speech "you're doing great, keep going." In another example, the system may output synthesized speech "not quite, let me read that back to you." In yet another example, the system may output synthesized speech "let's practice that word together <slowly> CAPTAIN. Captain. Now you try!" In some examples, the feedback may slowly pronounce a word(s) for the user 5 to understand; in this case, the feedback data may include appropriate SSML tags to indicate a certain word(s) is to be outputted at a slower rate.

In some embodiments, the content provider skill 290*b*/390*b* may include a prompt(s) in addition to "reading" the next portion or requesting the user 5 to read the next portion. The prompt(s) may indicate where the next portion starts. For example, the system may output synthesized speech "I'll start reading at page 3. Let's go fly a kite . . ." In another example, the system may output synthesized speech "Ok, why don't you read the next page starting with 'if you see . . .'"

In some embodiments, when the system is "reading" the content to the user 5, the system may display text representing the content at a display associated with the device 110. In some embodiments, the representation of the displayed text may be changed to visually indicate to the user 5 which word(s) are being "read" by the system as the system outputs synthesized speech representing the word(s).

In some embodiments, the functionalities described with respect to FIGS. 6A-6D as being performed by the learning/reading skill 290*a*/390*a* and the content provider skill 290*b*/390*b*, may be performed by the same skill 290/390 or more than two skills 290/390.

Figure 7:
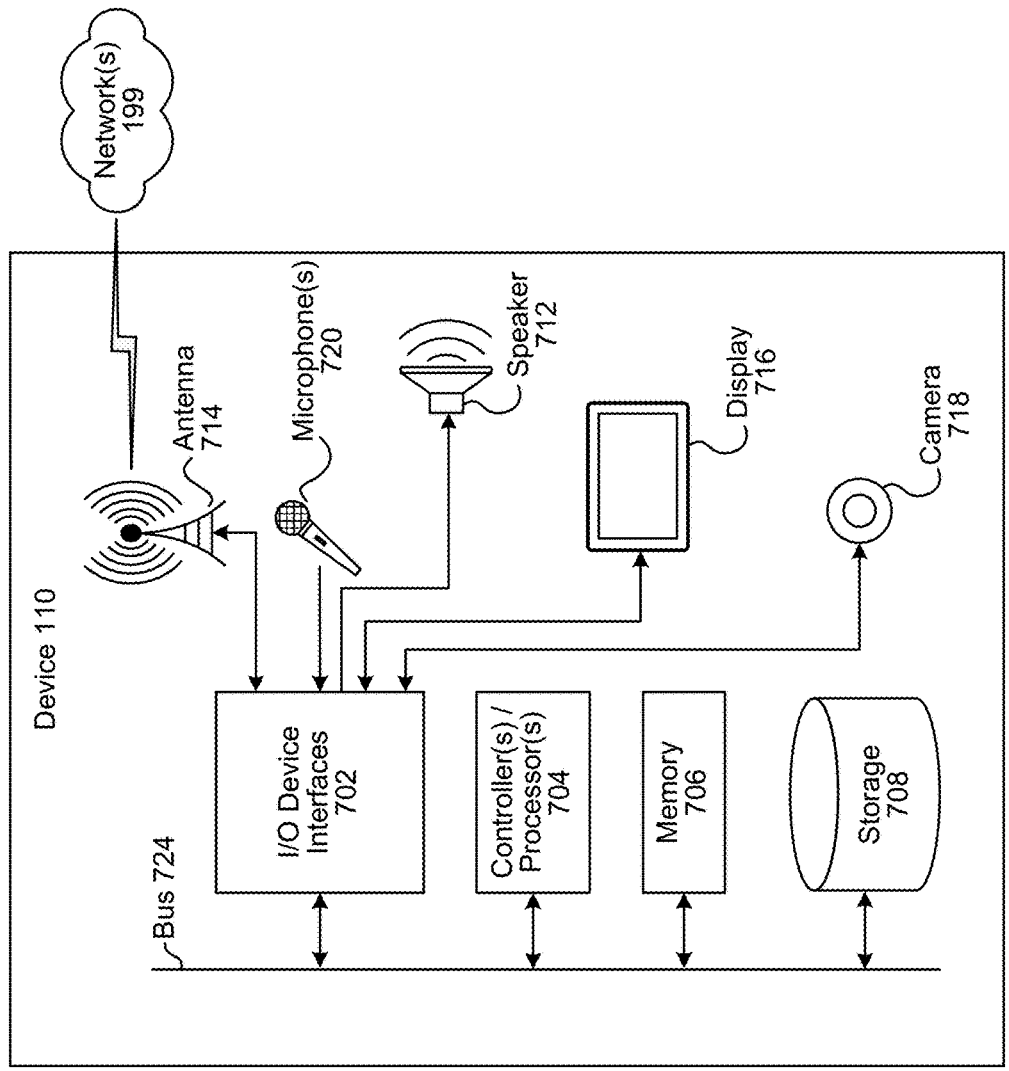
FIG. 7 is a block diagram conceptually illustrating example components of a device, according to embodiments of the present disclosure.
Figure 8:
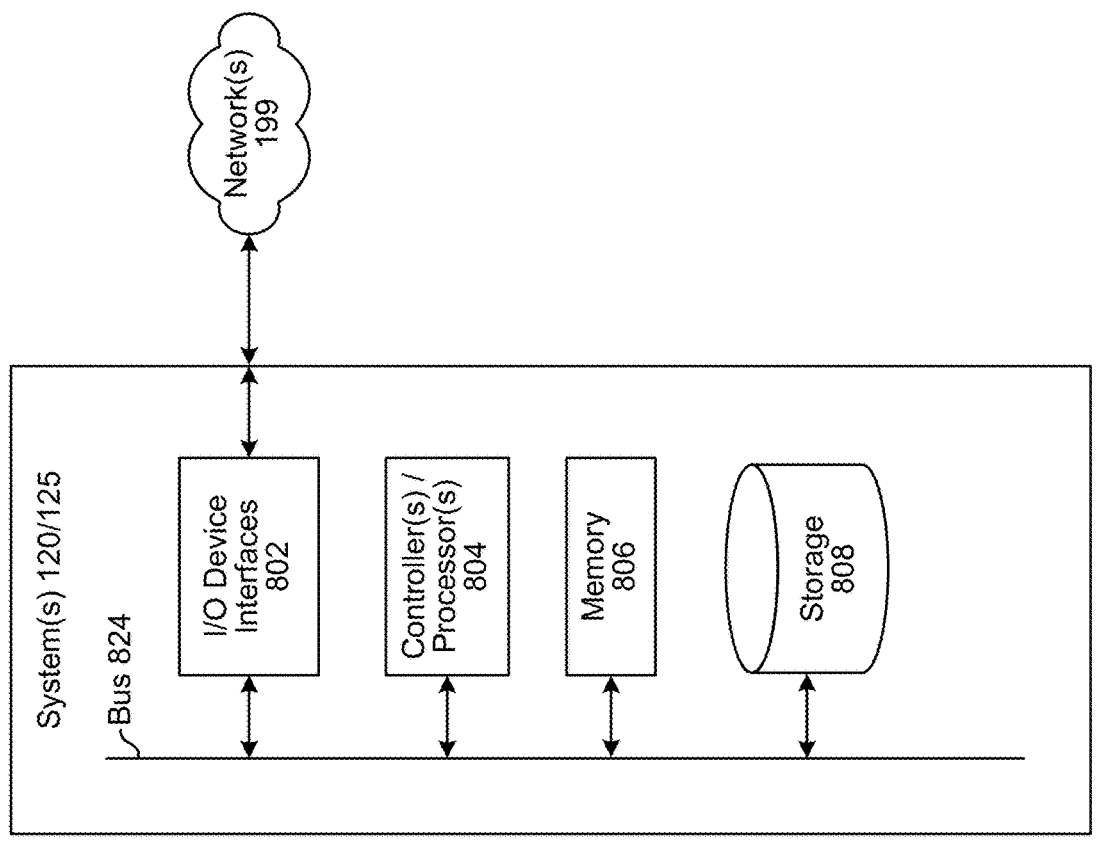
FIG. 8 is a block diagram conceptually illustrating example components of a system, according to embodiments of the present disclosure.

FIG. 7 is a block diagram conceptually illustrating example components of a device 110 according to the present disclosure. FIG. 8 is a block diagram conceptually illustrating example components of a system, such as the system 120 or a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 for performing ASR processing, one or more systems 120 for performing NLU processing, and one or more skill systems 225, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/225) may also include a data storage component (708/808) for storing data and controller/processor-executable instructions. Each data storage component (708/808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (702/802).

Computer instructions for operating each device (110/120/225) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/225) includes input/output device interfaces (702/802). A variety of components may be connected through the input/output device interfaces (702/802), as will be discussed further below. Additionally, each device (110/120/225) may include an address/data bus (724/824) for conveying data among components of the respective device. Each component within a device (110/120/225) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or a skill system 225 may include their own dedicated processors, memory, and/or storage. Alternatively, one or more of the components of the device 110, the system 120, and/or a skill system 225 may utilize the I/O interfaces (702/802), processor(s) (704/804), memory (706/806), and/or storage (708/808) of the device(s) 110, system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 225, as described herein, are illustrative, and may be located as a stand-alone device or may be included, in whole or in part, as a component of a larger device or system.

Figure 9:
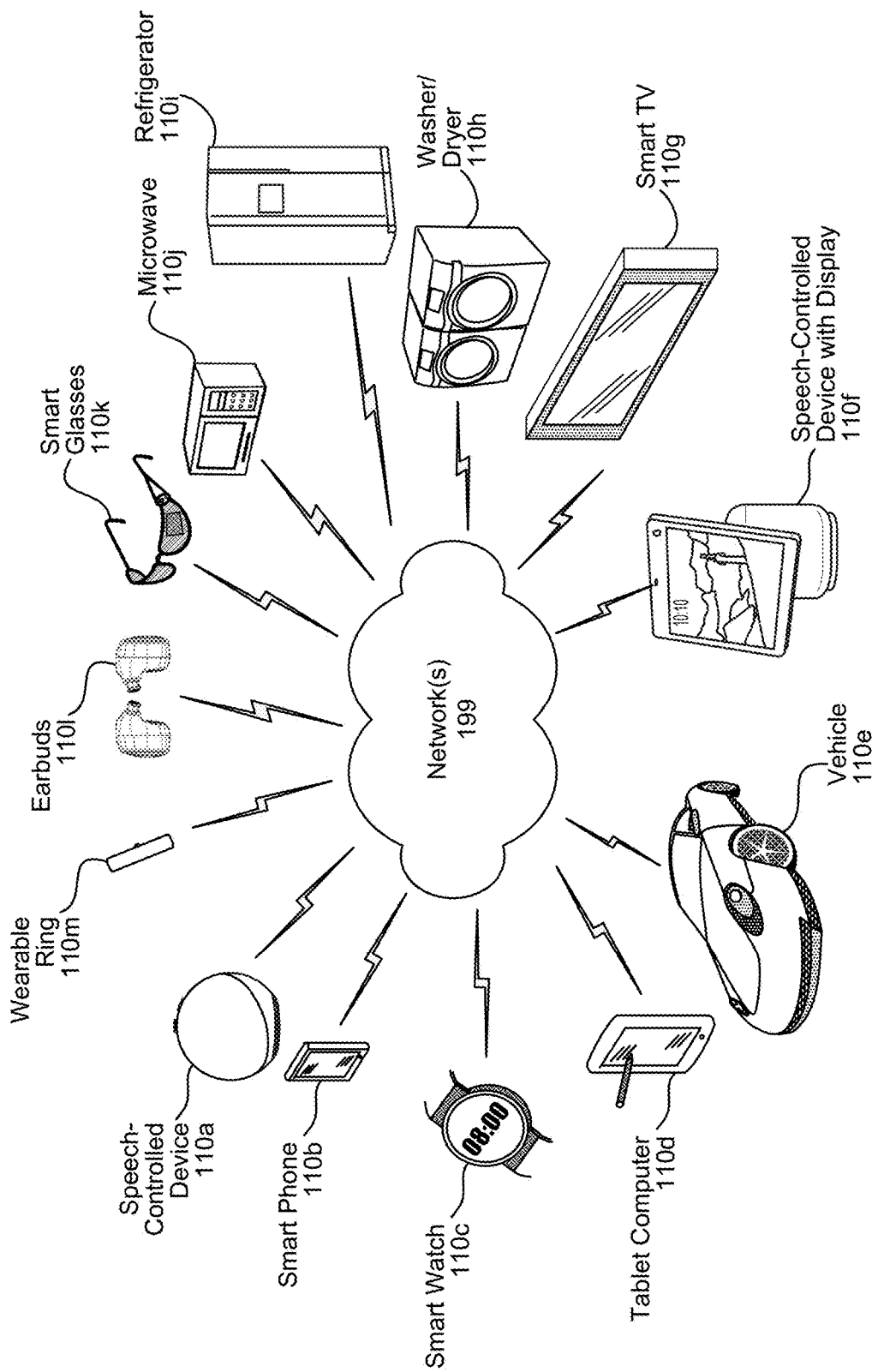
FIG. 9 illustrates an example of a computer network for use with the overall system, according to embodiments of the present disclosure.

As illustrated in FIG. 9, multiple devices (110a-1101) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, smart glasses 110k, earbuds 1101, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a device, first input audio data representing a spoken natural language input including a request to read a book, the first input audio data associated with a session identifier;
    processing the first input audio data to determine a book identifier associated with the book;
    receiving first text data associated with the book identifier, the first text data representing a first portion of the book;
    receiving, from the device, second input audio data including speech corresponding to the first portion of the book, the second input audio data associated with the session identifier;
    determining that the second input audio data corresponds to an entirety of the first portion of the book;
    determining, using a trained machine learning (ML) model, first reading evaluation data based on the second input audio data and the first text data, the first reading evaluation data associated with the session identifier;
    based on the first reading evaluation data, determining to output a second portion of the book;
    receiving second text data associated with the book identifier, the second text data representing the second portion of the book;
    performing text-to-speech (TTS) processing on the second text data to generate first output audio data representing the second portion of the book; and
    sending the first output audio data to the device.

2. The computer-implemented method of claim 1, further comprising:
    after the first output audio data is sent, enabling a listening mode to capture speech;
    receiving, from the device, third input audio data corresponding to a third portion of the book, the third input audio data associated with the session identifier;
    determining that the third input audio data corresponds to an entirety of the third portion of the book;
    enabling the listening mode;
    determining second reading evaluation data based on the third input audio data and third text data representing the third portion of the book, the second reading evaluation data associated with the session identifier;
    based on the second reading evaluation data, sending, to the device, second output audio data representing a request to read the third portion of the book;
    enabling the listening mode; and
    receiving, from the device, fourth input audio data corresponding to the third portion of the book.

3. The computer-implemented method of claim 1, further comprising:
    after the first output audio data is presented, enabling a listening mode to capture speech;
    receiving, from the device, third input audio data corresponding to a third portion of the book, the third input audio data associated with the session identifier, wherein the third portion of the book corresponds to a page in the book;
    determining that the third input audio data corresponds to an entirety of the third portion of the book;
    disabling the listening mode;
    determining second reading evaluation data based on the third input audio data and third text data representing the third portion of the book, the second reading evaluation data associated with the session identifier;
    based on the second reading evaluation data, determining to decrease amount of book to be read; and
    sending, to the device, second output audio data representing a request to read a fourth portion of the book, wherein the fourth portion of the book corresponds to a paragraph on the page.

4. The computer-implemented method of claim 1, wherein determining the first reading evaluation data comprises:
    performing automatic speech recognition (ASR) processing using the second input audio data to determine ASR output data;
    processing the ASR output data with respect to the first text data to determine first data representing a reading accuracy, the first data based at least on one of:
        deletion of a word in the ASR output data with respect to the first text data,
        insertion of a word in the ASR output data with respect to the first text data, and
        substitution of a word in the ASR output data with respect to the first text data;
    processing the second input audio data using the trained ML model to determine second data representing a pronunciation accuracy, the trained ML model configured to perform phoneme alignment; and
    determining the first reading evaluation data using the first data and the second data.

5. A computer-implemented method comprising:
    receiving first input audio data corresponding to speech representing a first portion of content;
    determining that the first input audio data corresponds to an entirety of the first portion of the content;
    determining, using a first trained machine learning (ML) model, first reading evaluation data based on the first input audio data and the first portion of the content;
    based on the first reading evaluation data, determining to output a second portion of the content;
    performing text-to-speech (TTS) processing to generate first output audio data including synthesized speech corresponding to the second portion of the content; and
    outputting the first output audio data.

6. The computer-implemented method of claim 5, further comprising:
    prior to receiving the first input audio data, receiving second input audio data representing a request to read content;
    receiving data representing the content;
    enabling a listening mode to capture speech; and
    disabling the listening mode after determining that the first input audio data corresponds to the entirety of the first portion of the content.

7. The computer-implemented method of claim 5, further comprising:
receiving second input audio data corresponding to reading of a third portion of content;
determining that the second input audio data corresponds to an entirety of the third portion of the content;
determining second reading evaluation data based on the second input audio data and the third portion of the content;
based on the second reading evaluation data, outputting second output audio data representing a request to read the third portion of the content; and
receiving third input audio data corresponding to the third portion of the content.

8. The computer-implemented method of claim 5, further comprising:
receiving second input audio data corresponding to reading of a third portion of content including a first number of words;
determining that the second input audio data corresponds to an entirety of the third portion of the content;
determining second reading evaluation data based on the second input audio data and the third portion of the content; and
based on the second reading evaluation data, outputting second output audio data representing a request to read a fourth portion of the content including a second plurality of words, wherein the second plurality of words is less than the first number of words.

9. The computer-implemented method of claim 5, wherein determining the first reading evaluation data comprises:
performing automatic speech recognition (ASR) processing using the first input audio data to determine ASR output data;
processing the ASR output data with respect to the first portion of the content to determine first data representing a reading accuracy;
processing the first input audio data the first trained ML model to determine second data representing a pronunciation accuracy, the first trained ML model configured to perform phoneme alignment; and
determining the first reading evaluation data using the first data and the second data.

10. The computer-implemented method of claim 5, further comprising:
prior to receiving the first input audio data, receiving second input audio data requesting to read a book;
receiving image data representing a book cover;
processing the image data, using a second trained machine learning model, to determine a title corresponding to the book;
determining a book identifier associated with the title; and
receiving data associated with the book identifier, the data representing the content.

11. The computer-implemented method of claim 5, further comprising:
receiving second input audio data;
performing ASR processing to determine ASR output data corresponding to the second input audio data;
performing natural language understanding (NLU) processing using the ASR output data to determine NLU data;
using the NLU data, determining that the second input audio data represents a spoken command rather than the content to be read; and
processing the NLU data to determine output data responsive to the spoken command.

12. The computer-implemented method of claim 5, further comprising:
receiving second input audio data;
performing ASR processing to determine ASR output data corresponding to the second input audio data;
performing natural language understanding (NLU) processing using the ASR output data to determine NLU data;
determining second reading evaluation data based on processing the ASR output data with respect to a second portion of the content to be read; and
based on the NLU data and the second reading evaluation data, determining that the second input audio data corresponds to a third portion of the content to be read.

13. A system comprising:
at least one processor; and
at least one memory including instructions that, when executed by the at least one processor, cause the system to:
receive first input audio data corresponding to speech representing a first portion of content;
determine that the first input audio data corresponds to an entirety of the first portion of the content;
determine, using a first trained machine learning (ML) model, first reading evaluation data based on the first input audio data and the first portion of the content;
based on the first reading evaluation data, determine to output a second portion of the content;
perform text-to-speech (TTS) processing to generate first output audio data including synthesized speech corresponding to the second portion of the content; and
output the first output audio data.

14. The system of claim 13, wherein the instructions that, when executed by the at least one processor, further cause the system to:
prior to receiving the first input audio data, receive second input audio data representing a request to read content;
receive data representing the content;
enable a listening mode to capture speech; and
disable the listening mode after determining that the first input audio data corresponds to the entirety of the first portion of the content.

15. The system of claim 13, wherein the instructions that, when executed by the at least one processor, further cause the system to:
receive second input audio data corresponding to reading of a third portion of content;
determine that the second input audio data corresponds to an entirety of the third portion of the content;
determine second reading evaluation data based on the second input audio data and the third portion of the content;
based on the second reading evaluation data, output second output audio data representing a request to read the third portion of the content; and
receive third input audio data corresponding to the third portion of the content.

16. The system of claim 13, wherein the instructions that, when executed by the at least one processor, further cause the system to:
receive second input audio data corresponding to reading of a third portion of content including a first number of words;

determine that the second input audio data corresponds to an entirety of the third portion of the content;

determine second reading evaluation data based on the second input audio data and the third portion of the content; and based on the second reading evaluation data, output second output audio data representing a request to read a fourth portion of the content including a second plurality of words, wherein the second plurality of words is less than the first number of words.

17. The system of claim 13, wherein the instructions that, when executed by the at least one processor, further cause the system to:

perform automatic speech recognition (ASR) processing using the first input audio data to determine ASR output data;

process the ASR output data with respect to the first portion of the content to determine first data representing a reading accuracy;

process the first input audio data using the first trained ML model to determine second data representing a pronunciation accuracy, the first trained ML model configured to perform phoneme alignment; and determine the first reading evaluation data using the first data and the second data.

18. The system of claim 13, wherein the instructions that, when executed by the at least one processor, further cause the system to:

prior to receiving the first input audio data, receive second input audio data requesting to read a book;

receive image data representing a book cover;

process the image data, using a second trained machine learning model, to determine a title corresponding to the book;

determine a book identifier associated with the title; and receive data associated with the book identifier, the data representing the content.

19. The system of claim 13, wherein the instructions that, when executed by the at least one processor, further cause the system to:

receive second input audio data;

perform ASR processing to determine ASR output data corresponding to the second input audio data;

perform natural language understanding (NLU) processing using the ASR output data to determine NLU data;

using the NLU data, determine that the second input audio data represents a spoken command rather than the content to be read; and process the NLU data to determine output data responsive to the spoken command.

20. The system of claim 13, wherein the instructions that, when executed by the at least one processor, further cause the system to:

receive second input audio data;

perform ASR processing to determine ASR output data corresponding to the second input audio data;

perform natural language understanding (NLU) processing using the ASR output data to determine NLU data;

determine second reading evaluation data based on processing the ASR output data with respect to a second portion of the content to be read; and based on the NLU data and the second reading evaluation data, determine that the second input audio data corresponds to a third portion of the content to be read.

* * * * *